United States Patent
Chai

(10) Patent No.: US 8,885,322 B2
(45) Date of Patent: Nov. 11, 2014

(54) CERAMIC CAPACITOR AND METHODS OF MANUFACTURE

(75) Inventor: Liang Chai, Stuart, FL (US)

(73) Assignee: Apricot Materials Technologies, LLC, Jupiter, FL (US)

( * ) Notice: Subject to any disclaimer, the term of this patent is extended or adjusted under 35 U.S.C. 154(b) by 192 days.

(21) Appl. No.: 13/270,645

(22) Filed: Oct. 11, 2011

(65) Prior Publication Data

US 2012/0262836 A1    Oct. 18, 2012

Related U.S. Application Data

(63) Continuation-in-part of application No. 12/969,186, filed on Dec. 15, 2010, now Pat. No. 8,561,271.

(60) Provisional application No. 61/392,450, filed on Oct. 12, 2010.

(51) Int. Cl.
*H01G 4/06* (2006.01)
*H01G 4/005* (2006.01)
*H01G 4/12* (2006.01)
*H01G 4/30* (2006.01)
*H01G 4/33* (2006.01)

(52) U.S. Cl.
CPC ............ *H01G 4/1245* (2013.01); *H01G 4/1263* (2013.01); *H01G 4/30* (2013.01); *H01G 4/1227* (2013.01); *H01G 4/005* (2013.01); *H01G 4/33* (2013.01); *H01G 4/12* (2013.01)
USPC ...................... 361/311; 361/321.1; 361/321.2; 361/303; 361/304

(58) Field of Classification Search
USPC ......... 361/321.1, 321.2, 321.3, 311, 303, 304
See application file for complete search history.

(56) References Cited

U.S. PATENT DOCUMENTS

| 4,063,341 A | 12/1977 | Bouchard et al. ............. 29/25.42 |
| 4,228,482 A | 10/1980 | Bouchard et al. .......... 361/321.4 |

(Continued)

FOREIGN PATENT DOCUMENTS

| JP | 01-313803 A | 12/1989 |
| JP | 03-208323 A | 9/1991 |

(Continued)

OTHER PUBLICATIONS

Molberg et al., High Breakdown Field Dielectric Elastomer Actuators Using Encapsulated Polyaniline as High Dielectric Constant Filler, Advanced Functional Materials 2010, pp. 3280-3291.

(Continued)

*Primary Examiner* — Jayprakash N Gandhi
*Assistant Examiner* — Dion R Ferguson
(74) *Attorney, Agent, or Firm* — Smith Risley Tempel Santos LLC; Steven P. Wigmore

(57) ABSTRACT

A capacitor includes a pair of electrodes and a metalized dielectric layer disposed between the pair of electrodes, in which the metalized dielectric layer has a plurality of metal aggregates distributed within a dielectric material. The distribution is such that a volume fraction of metal in the metalized dielectric layer is at least about 30%. Meanwhile, the plurality of metal aggregates are separated from one another by the dielectric material. A method for forming a metal-dielectric composite may include coating a plurality of dielectric particles with a metal to form a plurality of metal-coated dielectric particles and sintering the plurality of metal-coated dielectric particles at a temperature of at least about 750° C. to about 950° C. to transform the metal coatings into discrete, separated metal aggregates. Contrary to conventional techniques of separating electrodes by a dielectric tape, this inventive system and method demonstrates that a metalized dielectric layer may be formed in-situ during sintering.

13 Claims, 24 Drawing Sheets

(56) References Cited

U.S. PATENT DOCUMENTS

| | | | |
|---|---|---|---|
| 4,880,170 A | 11/1989 | Kemp et al. | |
| 5,086,021 A | 2/1992 | Sasaki et al. | 501/137 |
| 5,155,072 A | 10/1992 | Bruno et al. | 501/138 |
| 5,534,290 A | 7/1996 | Rainwater et al. | 427/79 |
| 6,300,267 B1 | 10/2001 | Chen et al. | 501/135 |
| 6,362,947 B1 | 3/2002 | Chazono | |
| 6,395,332 B1 | 5/2002 | Hanawa et al. | |
| 6,404,616 B2 | 6/2002 | Mizuno | |
| 6,409,776 B1 | 6/2002 | Yan et al. | |
| 6,436,862 B1 | 8/2002 | Hirota et al. | |
| 6,514,603 B2 | 2/2003 | Chazono | |
| 6,525,921 B1 | 2/2003 | Nakatani et al. | |
| 6,618,238 B2 | 9/2003 | Sanville, Jr. | |
| 6,780,494 B2 | 8/2004 | Kobayashi et al. | |
| 6,795,295 B2 | 9/2004 | Murakami et al. | |
| 6,906,906 B2 | 6/2005 | Hattori | |
| 6,972,473 B2 | 12/2005 | Beroz | |
| 6,977,806 B1 | 12/2005 | Sakashita | |
| 7,131,174 B2 | 11/2006 | Kobayashi et al. | |
| 7,457,104 B2 | 11/2008 | Lee et al. | |
| 7,495,891 B2 | 2/2009 | Lee et al. | |
| 7,594,937 B2 | 9/2009 | Amita et al. | |
| 7,609,504 B2 | 10/2009 | Park et al. | |
| 7,621,976 B2 | 11/2009 | Hampden-Smith et al. | 75/338 |
| 7,732,002 B2 | 6/2010 | Kodas et al. | 427/58 |
| 7,903,387 B2 | 3/2011 | Masuda et al. | |
| 2003/0116348 A1 | 6/2003 | Nakatani et al. | |
| 2004/0012913 A1 | 1/2004 | Andelman | |
| 2004/0233613 A1 | 11/2004 | Kasahara et al. | |
| 2006/0023398 A1* | 2/2006 | Iwanaga | 361/321.2 |
| 2006/0087795 A1 | 4/2006 | Nagasawa et al. | |
| 2006/0256503 A1* | 11/2006 | Kato et al. | 361/311 |
| 2008/0198533 A1 | 8/2008 | Lee et al. | |
| 2008/0239620 A1 | 10/2008 | Min et al. | |
| 2009/0103248 A1 | 4/2009 | Lin | |
| 2010/0110608 A1 | 5/2010 | Wei et al. | |
| 2010/0283122 A1 | 11/2010 | Pulugurtha et al. | |
| 2011/0310528 A1 | 12/2011 | Chai et al. | 361/321.1 |
| 2012/0262836 A1 | 10/2012 | Chai | 361/301.4 |

FOREIGN PATENT DOCUMENTS

| | | | |
|---|---|---|---|
| JP | 05-166667 A | 7/1993 |
| JP | 07-130573 A | 5/1995 |
| JP | 11-214240 A | 8/1999 |
| JP | 11-312629 A | 11/1999 |
| JP | 08-016578 A | 1/2008 |

OTHER PUBLICATIONS

Shen et al., High Dielectric Performance of Polymer Composite Films Induced by a Percolating Interparticle Barrier Layer, Advanced Materials 2007, pp. 1418-1422.

Zois et al., Structure and Dielectric Properties of Thermoplastic Blend Containing Dispersed Metal, Macromolecular Symposium 2003, pp. 461-472.

Sumesh et al., Three-phase polymer—ceramic—metal composite for embedded capacitor applications, Composites Science and Technology 69 (2009), pp. 1298-1302.

Xu et al., A Novel Aluminum-Filled Composite Dielectric for Embedded Passive Applications, IEEE Transactions on Advanced Packaging, vol. 29. No. 2, May 2006, pp. 295-306.

Zois et al., Dielectric Properties and Morphology of Polymer Composites Filled with Dispersed Iron, Journal of Applied Polymer Science, vol. 88, pp. 3013-3020 (2003).

McQueen et al., Multiple threshold percolation in polymer/filler composites, J. Phys. D: Applied Physics 37 (2004), pp. 2160-2169.

Moya et al., The challenge of ceramic/metal microcomposites and nanocomposites, Progress in Materials Science 52 (2007), pp. 1017-1090.

PCT International Preliminary Report on Patentability, mailed Apr. 25, 2013, for PCT Application Serial No. PCT/US2011/055760 filed on Oct. 11, 2011—nine sheets.

PCT International Preliminary Report on Patentability issued on Jun. 19 2012 for PCT Application Serial No. PCT/US2010/060547 filed Dec. 15, 2010. 6 pages.

* cited by examiner

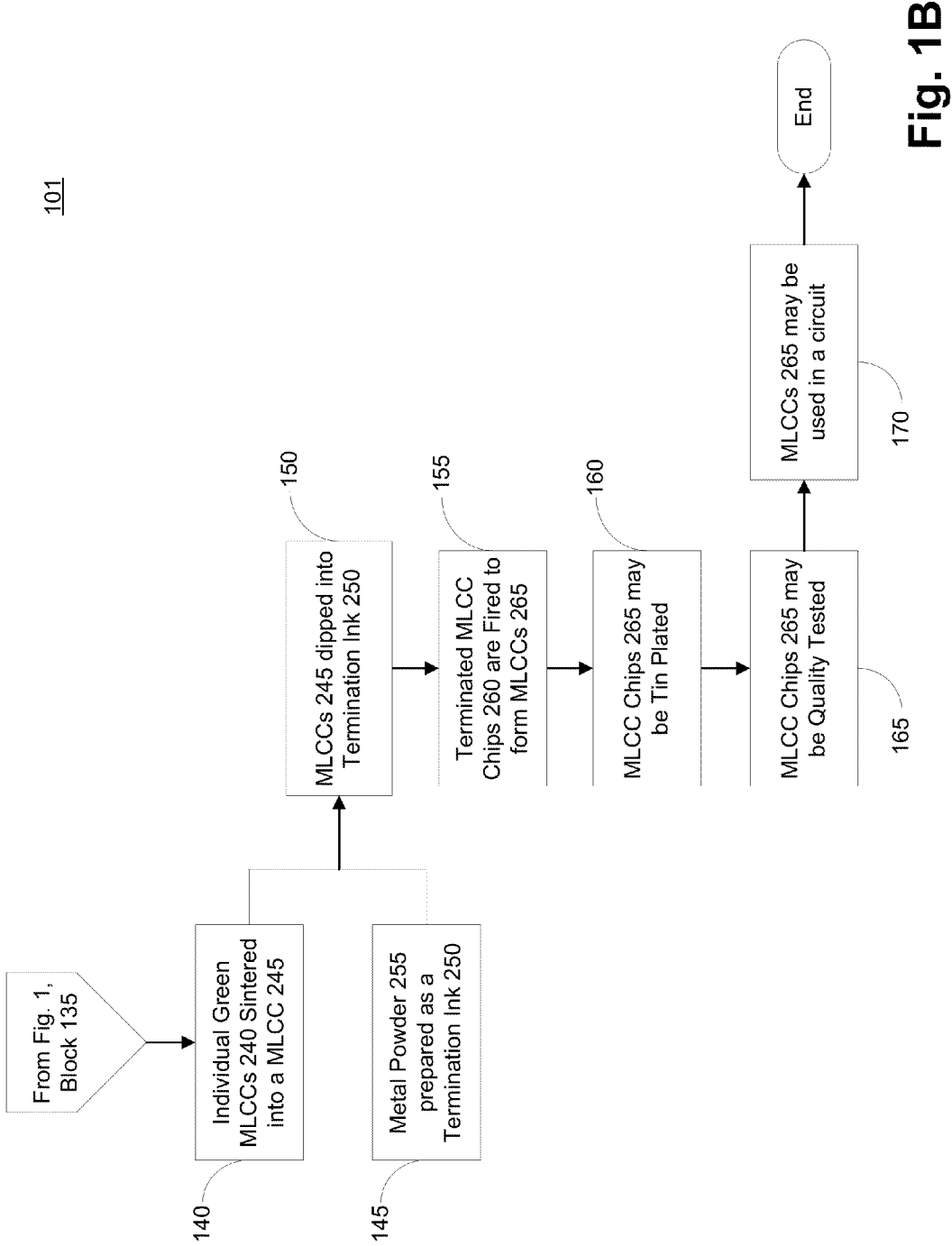

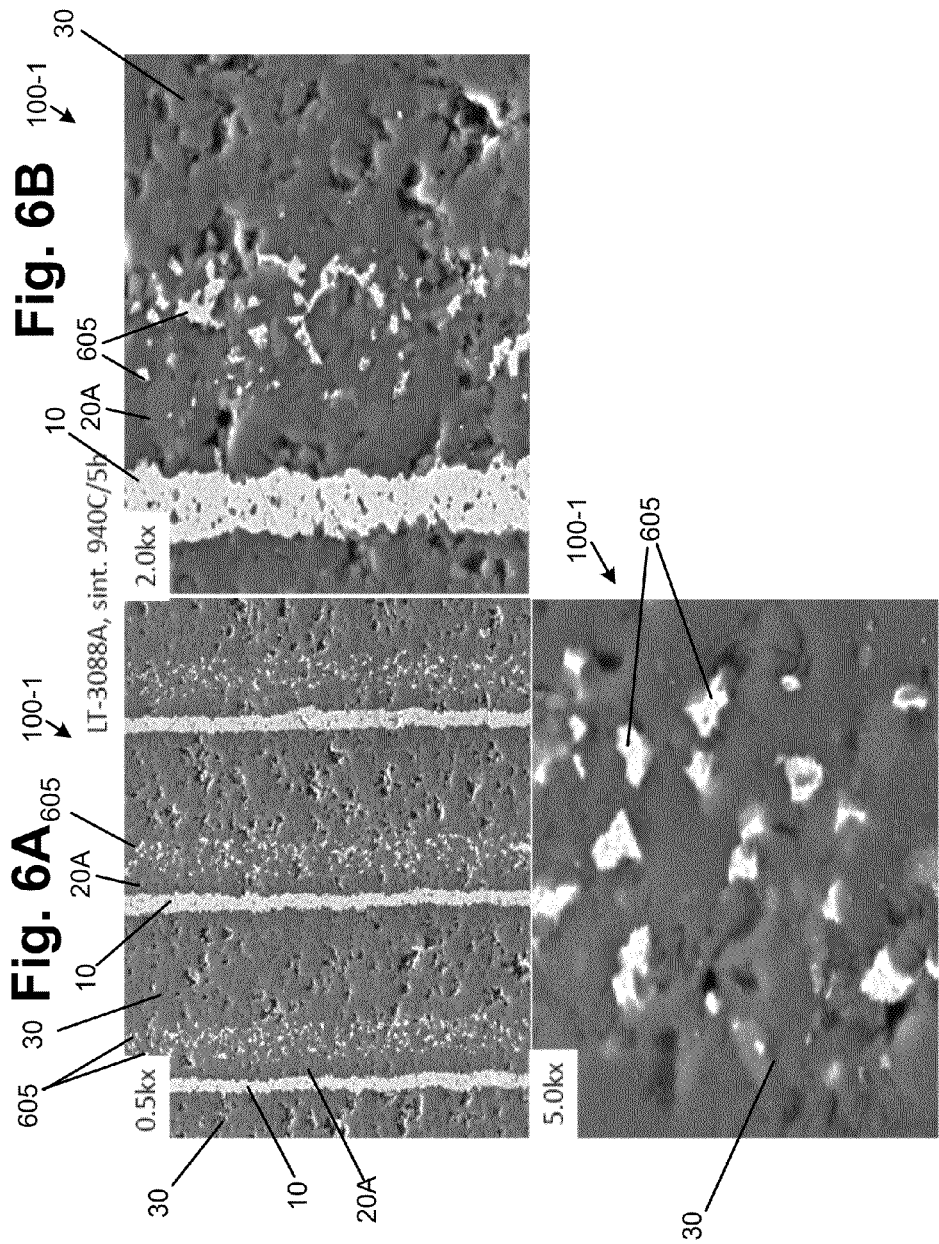

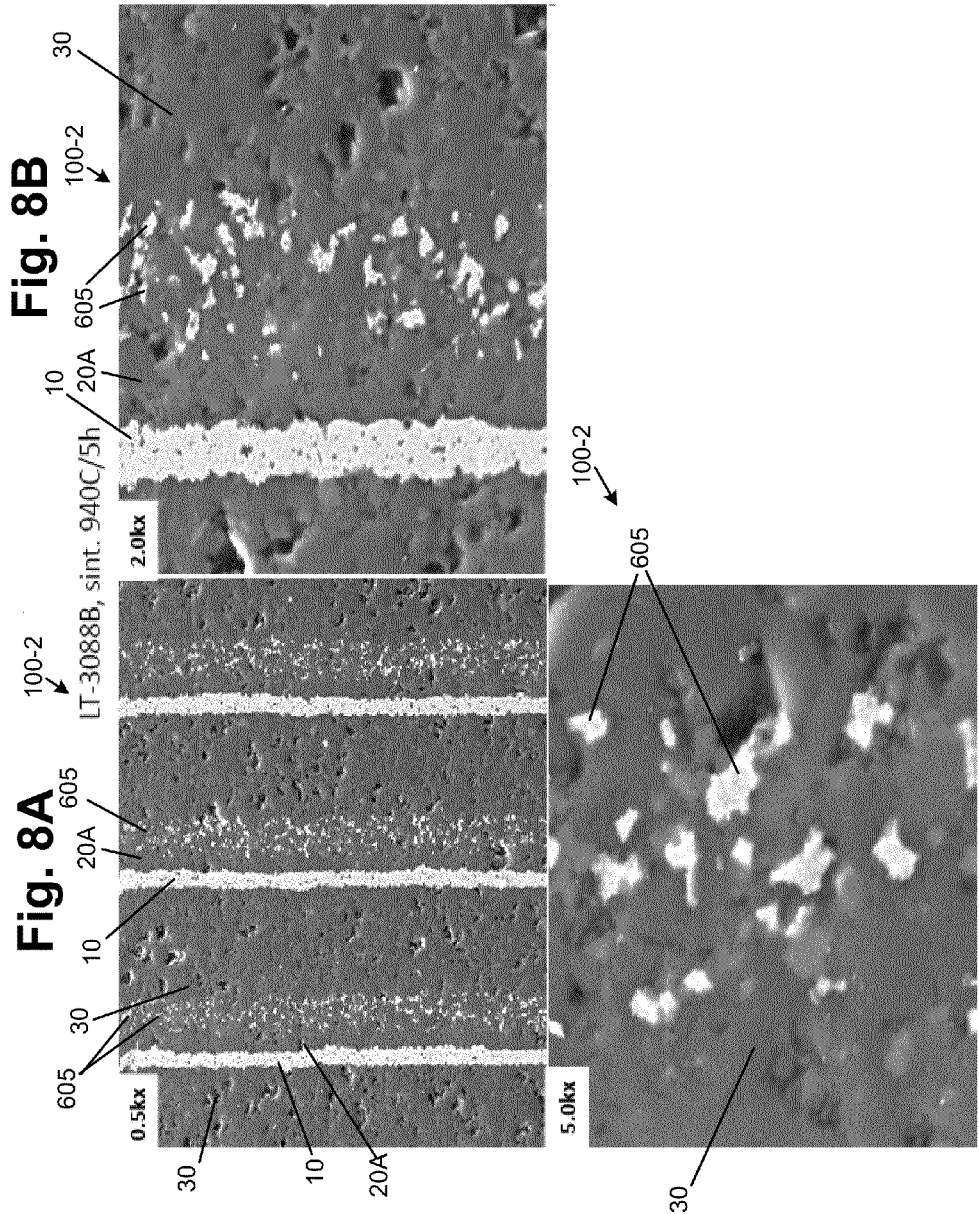

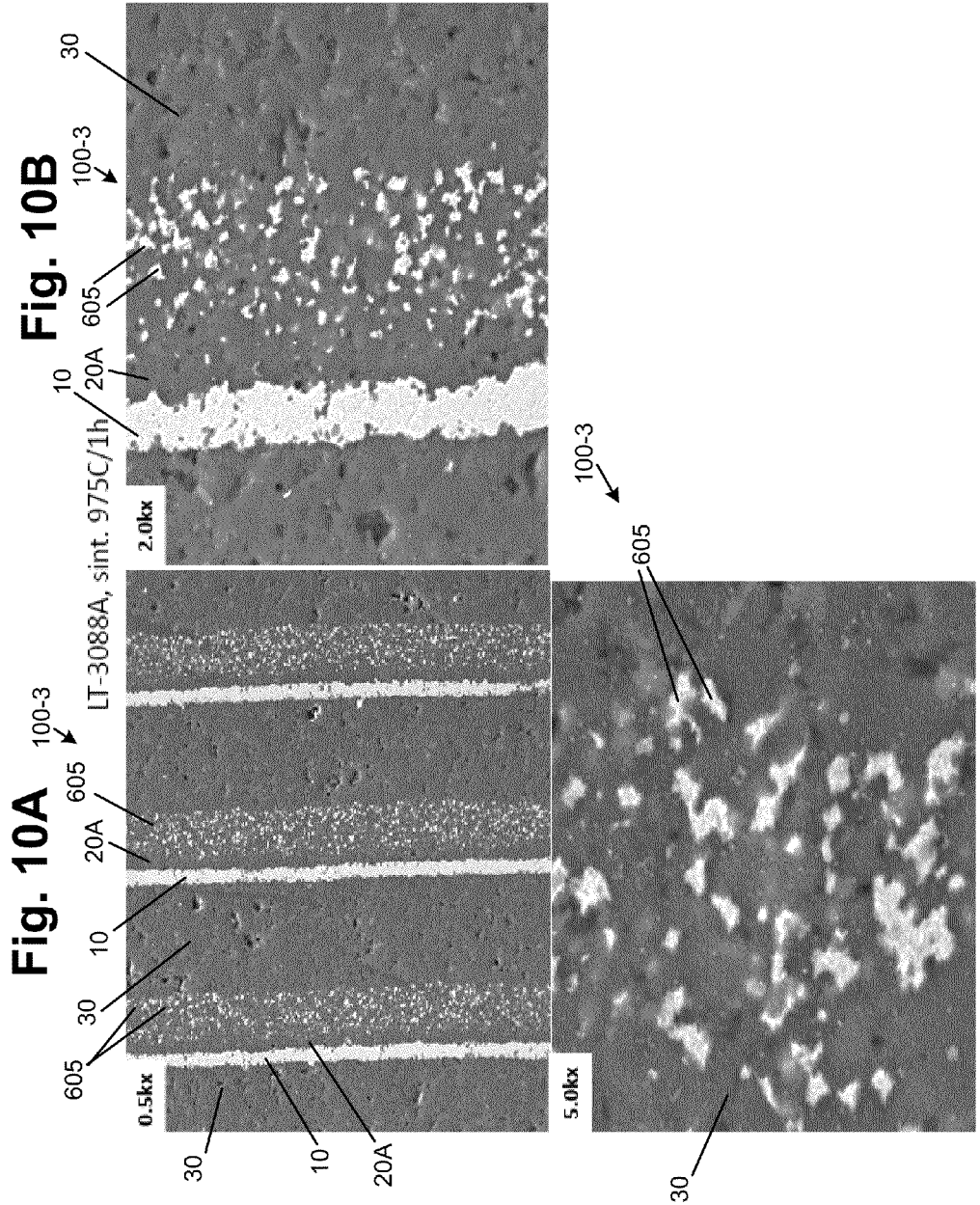

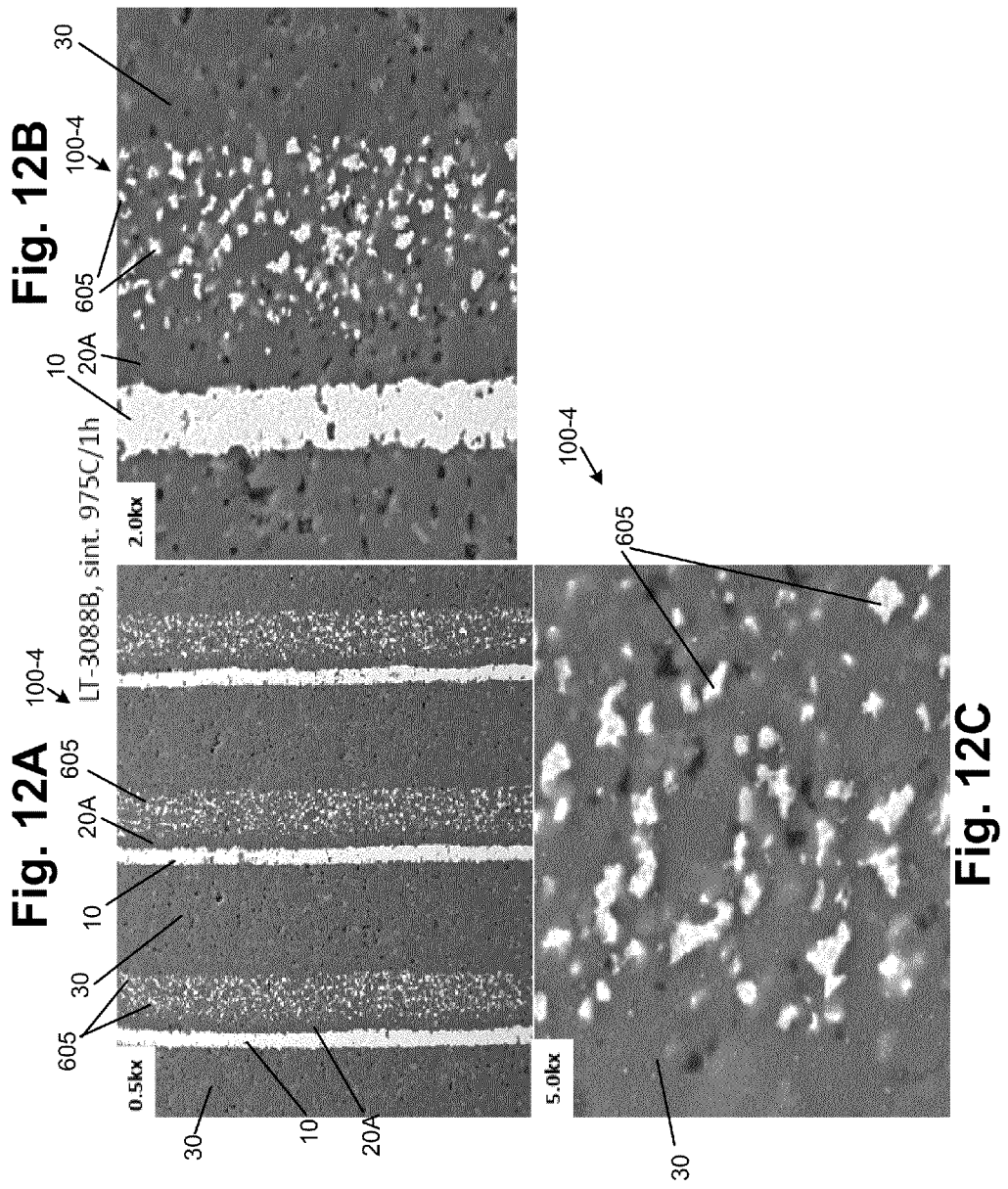

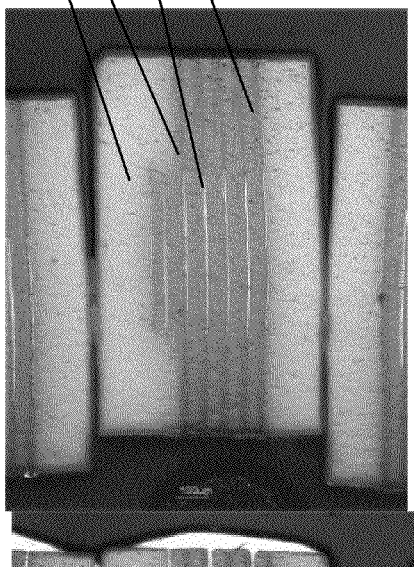
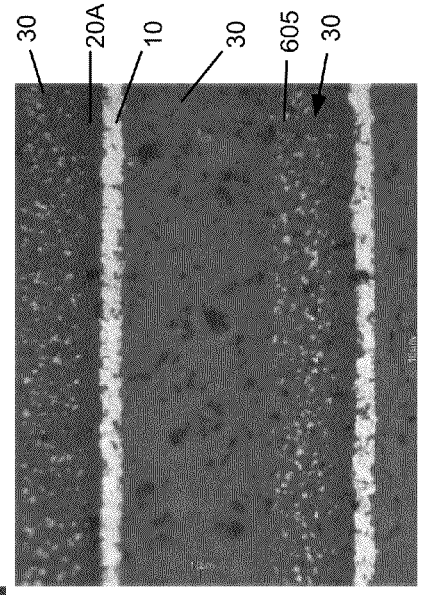
Fig. 13B
Fig. 13D
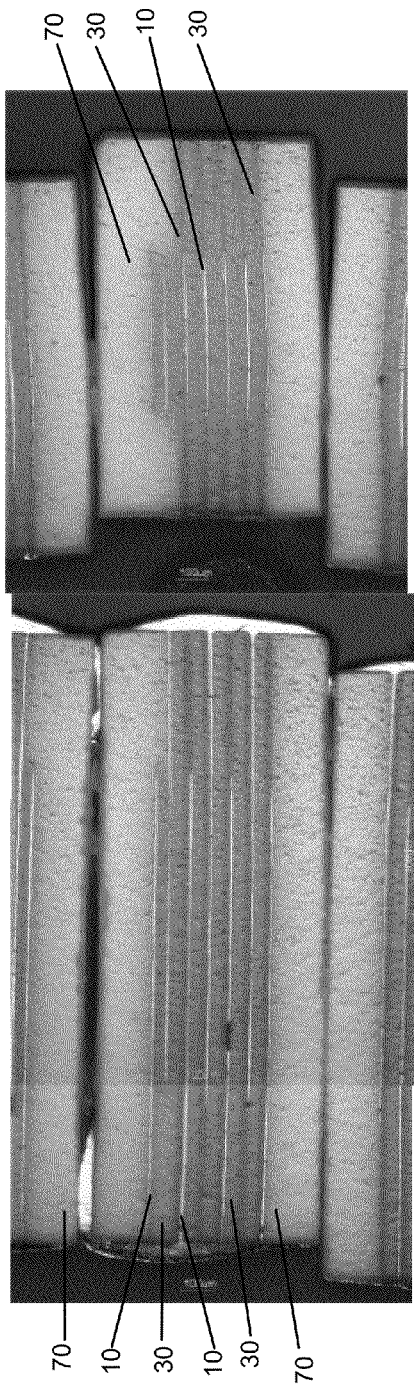
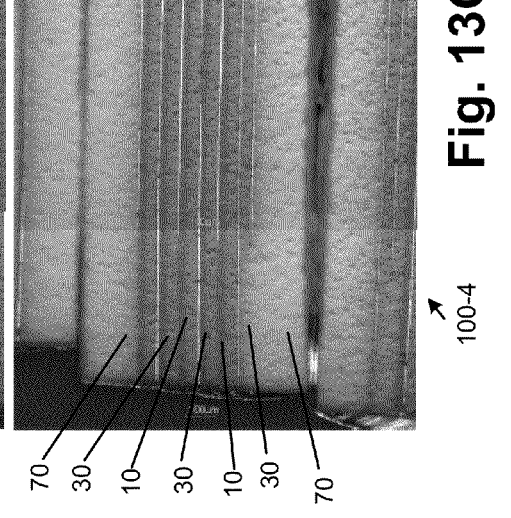
Fig. 13A
Fig. 13C

CERAMIC CAPACITOR AND METHODS OF MANUFACTURE

CROSS-REFERENCE TO RELATED APPLICATIONS

This application is a continuation-in-part of and claims priority under 35 U.S.C. §120 to U.S. non-provisional application entitled "CAPACITOR WITH THREE-DIMENSIONAL HIGH SURFACE AREA ELECTRODE AND METHODS OF MANUFACTURE," filed on Dec. 15, 2010 assigned application Ser. No. 12/969,186 now U.S. Pat. No. 8,561,271. Priority under 35 U.S.C. §119(e) is also claimed to U.S. provisional application entitled "CERAMIC CAPACITOR AND METHOD OF MAKING THE SAME," filed on Oct. 12, 2010 assigned application Ser. No. 61/392,450. The entire contents of these two patent applications are hereby incorporated by reference.

BACKGROUND

A capacitor is any device having the principal electric property of capacitance, i.e. the ability to store an electric charge. In the field of electronics, the ability of a capacitor to store an electric charge is useful in controlling the flow of an electric current. Moreover, capacitors may be employed in circuits for the purpose of filtering electrical signals; for example, a capacitor with variable capacitance can be used in the tuning circuit of a radio or television receiver. Varying the capacitance changes the resonant frequency of the tuner circuit so that it matches the frequency of the desired station or channel, filtering out signals of all unwanted frequencies.

The simplest of capacitors will comprise two plates of a conductive material separated from one another by an insulator, also referred to as a dielectric, with each plate connected to a terminal. When voltage is placed across the terminals of an uncharged capacitor, charge flows to each of the plates (positive charge to the anode plate and negative charge to the cathode plate) but not across the insulator sandwiched between the conductive plate. As the opposite charges increase on the conductive anode and cathode plates, the force on the dielectric between them also increases, thereby causing the electric field across the dielectric to increase. This phenomenon gives rise to a voltage which increases proportionally with the charge on the plates.

The ratio of the charge magnitude on each plate to the electric potential (voltage) between the plates is the aforementioned capacitance and approximates the externally applied voltage source used to charge the capacitor. When these two voltages have the same magnitude (the voltage source and the capacitor), the current ceases to flow and the capacitor is considered to be charged. A charged capacitor is subsequently discharged by reducing the external voltage through an applied electrical load, thus causing a decrease in the voltage across the plates when a produced current quickly flows the charge off the plates.

There are many types of capacitors, each varying in construction and material combinations, but the physics explained above are essentially the same for all. A common capacitor type employs ceramic for the dielectric layer and may take either a cylindrical structure, wherein a hollow cylinder of the ceramic material is lined with thin films of conductive metal on its inner and outer surfaces, or a flat, parallel plate structure wherein a plurality of plates of ceramic and conductive materials are interleaved to create the sandwiched "electrode-dielectric-electrode" arrangement.

Manufacturing is fairly straightforward for capacitors comprising of the so-called parallel plate structure. A layer of dielectric is sandwiched between two conductive electrode layers, wherein capacitance of the resulting parallel plate capacitor is a function of the overlapped area of the electrode plates, thickness of the dielectric layer, and the permittivity of the dielectric.

A multi-layer ceramic capacitor (MLCC) is a parallel plate capacitor having a plurality of stacked "electrode-dielectric-electrode" arrangements (EDE), where each may form a tri-layer. The capacitance of a MLCC may be drastically increased by the parallel connection of the many parallel plates. Quite simply, more stacked arrangements increases capacitance and forms a MLCC. Similarly, individual capacitors can also be connected in series, essentially spreading the above described MLCC over a larger surface area as opposed to a higher amount of head room.

An advantage of serially connected capacitors over a highly stacked MLCC is that the serial arrangement is known in the art to exhibit better resistance to voltage breakdown (as the charge and voltage on a given capacitor are increased, at some point the dielectric will no longer be able to insulate the charges from each other, subsequently exhibiting dielectric breakdown, or high conductivity in some areas, which tends to lower the stored energy and charge, generating internal heat).

Turning back to the manufacturing methods employed to make typical MLCCs, a capacitor may be made by applying a dielectric slurry, such as a ceramic based slurry, between alternating pairs of conductive plates. However, the manufacturing of MLCCs has largely migrated to the use of a conductive ink or paste (an ink or paste comprising a conductive material such as, for example, silver), in lieu of plates; This ink or paste may be screen-printed over a "green tape" of a dielectric slurry which was previously cast on a carrier polymer film. Consistent with what has been described above, many layers of interleaved dielectric tapes and electrode applications can be stacked and laminated together to form a final MLCC product.

Multi-layer ceramic capacitors with about 500 to about 1000 layers, where the dielectric layers often being less than about 1 micron thickness, are achievable. Reduction in layer thickness in a MLCC directly correlates with saved head room, however, it is often not the headroom that comes at a premium. In actuality, the overall surface area required to accommodate a passive electrical component, such as a MLCC, represents valuable real estate in an electrical circuit.

To reduce the space passive components occupy using surface mount technology, 0402 size (about 0.04 inch by about 0.02 inch) is gaining momentum as the most popular and even 0201 (about 0.02 inch by about 0.01 inch) can be reliably produced. Generally, when holding capacitance constant, the smaller the MLCC is, the better. However, there is a limit to simply reducing the area footprint and increasing layer quantities as continued reduction in the thickness of dielectric and electrode layers can create manufacturing problems. Therefore, there is a need to provide alternate methods to continue the trend to reduce the size and increase the capacitive density of the ceramic capacitor, and there is a need for capacitors exhibiting enhanced capacitive density.

SUMMARY

In one aspect, a capacitor is disclosed that includes a pair of electrodes and a metalized dielectric layer disposed between the pair of electrodes, in which the metalized dielectric layer has a plurality of metal aggregates distributed within a dielectric material. The distribution is such that a volume fraction of metal in the metalized dielectric layer is at least about 20 weight percent (wt %), or at least about 30 wt %, or at least about 40 wt %, or at least about 50 wt %, e.g., in a range of about 30 wt % to about 60 wt %. In many embodiments, the plurality of metal aggregates (also referred to as "metal inclusions") are separated from one another by the dielectric material.

In many embodiments, the metal aggregates provide a significant volume fraction of the metalized dielectric layer, such as the above volume fractions, without forming a percolation metal network.

In some exemplary embodiments, the volume fraction of the metal in the metalized dielectric layer may be greater than about 40%, e.g., in a range of about 40% to about 60%. In other embodiments, the volume fraction of the metal may be in a range of about 50% to about 60%.

In some embodiments, the metalized dielectric layer can have a thickness in a range of about 0.01 to about 250.0 microns.

In some embodiments, the metalized dielectric layer is separated from at least one of the electrodes by a substantially metal free dielectric layer (herein also referred to as "depletion layer"). In some such embodiments, the metalized dielectric layer is separated from each of two electrodes between which it is disposed by a substantially metal free dielectric layer. In some embodiments, the thickness of the substantially metal free dielectric layer is in a range of about 5.0 to about 10.0 microns.

In some embodiments, the metalized dielectric layer is configured as a floating electrode (i.e., an electrode that is not configured for coupling to an external voltage source), while in some other embodiments, the metalized dielectric layer is configured as an electrode suitable for electrical coupling with a voltage terminal.

In some embodiments, the above capacitor having the metalized dielectric layer exhibits a capacitance that is at least 2 times (e.g., in a range of 2 to about 1000 times) greater than the capacitance of a putative capacitor having the same size, electrodes, and dielectric material but lacking the metal inclusions.

In some embodiments, the dielectric material comprises a ceramic. For example, the dielectric material can be in the form of a plurality of ceramic particles having a size, e.g., in a range of about 0.01 microns to about 15.0 microns, and more particularly from about 0.05 microns to about 10.0 microns. In many such embodiments, the metal aggregates of the metalized dielectric layer can be in the form of metal inclusion disposed on the outer surfaces of the ceramic particles.

In some embodiments, the ceramic particles are formed of any of BaTiO3, doped BaTiO3, and other barium titanates dielectrics.

In some embodiments, in the above capacitor, at least one of the electrodes is formed of a metallic constituent that has at least one component in common with the metal incorporated in the dielectric. For example, in some embodiments, both electrodes are formed of the same metal as that incorporated in the dielectric.

In another aspect, a capacitor is disclosed that includes at least one pair of electrodes and a dielectric layer disposed between the electrodes, where the dielectric layer includes a metalized portion. The metalized portion can be in the form of a metal-dielectric composite in which separated metal inclusions are distributed within the dielectric. The capacitor exhibits a capacitance that is at least about 3 times, or at least about 5 times, or at least about 10 times, or at least about 20 times greater than the capacitance of a control capacitance that is identical in every respect (e.g., it has the same size with electrodes and the dielectric layer formed of the same metal and dielectric material, respectively) except for lacking the metal incorporated in the dielectric layer. For example, the capacitor can exhibit a capacitance that is greater than that of the control capacitor by a factor in a range of about 3 to about 1000.

In some embodiments, an effective dielectric constant of the metal-incorporated dielectric can be in range of about 20 to about 120 for a normal dielectric with a dielectric constant of 20. While in some embodiments, the metal inclusions are distributed throughout the entire dielectric layer in other embodiments the metal inclusions are confined with a portion of the dielectric layer. In some cases, such a metalized layer can be separated from at least one of the electrodes by a layer that is substantially free of the metal inclusions ("depletion layer").

In another aspect, a method for forming a metal-dielectric composite is disclosed that may include coating a plurality of dielectric particles with a metal to form a plurality of metal-coated dielectric particles and sintering the plurality of metal-coated dielectric particles to transform the metal coatings into a plurality of discrete, separated metal aggregates. In general, the sintering temperature is selected based on the metal used for coating the ceramic particles. For example, in some embodiments, the sintering temperature may be at least about 800° C., e.g., when silver is used. The sintering temperature may be generally in a range of about 750° C. to about 950° C., and more particularly, between about 850° C. to about 945° C. The plurality of metal-coated dielectric particles may be sintered for a duration in a range of about 10 minutes to about 1000 minutes, though other temperatures and sintering durations can also be utilized.

In some embodiments of the above method, some of the metal incorporated in the dielectric layer migrates to at least one of the electrodes during the high temperature sintering process so as to form a thin dielectric layer adjacent that electrode, where the thin dielectric layer is substantially free of the metal ("depletion layer"). In other words, the depletion layer, which can have a thickness in a range of about 0.01 micron to about 20.0 microns, e.g., in a range of about 0.01 micron to about 10.0 microns, may be formed in-situ during the sintering process. In some embodiments, the metallic constituent(s) of at least one of the electrodes and that of the metal incorporated in the dielectric are selected to have at least one component in common to facilitate in-situ formation of the depletion layer, e.g., by facilitating "wicking" of a portion of the metal incorporated in the dielectric to the electrode.

The inventive system demonstrates that a metalized dielectric layer may be formed in-situ during sintering. A capacitor structure may be created in-situ during the sintering process of a multi-layer ceramic capacitor (MLCC). For example, in a precious metal MLCC, silver in a silver dielectric composite forming a dielectric layer tends to migrate into the electrode layer during sintering of the multilayer ceramic capacitor. The dielectric left in the silver dielectric composite forms the dielectric layer in the capacitor structure. The thickness of this thin dielectric layer can vary depending upon the parameters, such as, type of the metal, or alloy, percentage of the metal content, sintering temperature and duration, dielectric compositions. Typically, a thickness from about 0.1 to about 20 microns can be achieved, and more typically, between about 0.2 to about 5 microns. The capacitor structure created in-situ during sintering may complement with the current tape buildup technology to manufacture an improved MLCC.

BRIEF DESCRIPTION OF THE DRAWINGS

FIGS. 1A-1B collectively illustrate a modified manufacturing process according to an embodiment for generating a three-dimensional multi-layer ceramic capacitor having EDE tri-layers.

FIGS. 6A-6C illustrate cross-sectional metallurgical microstructure views produced by a scanning electron microscope (SEM) of a first sample MLCC using Ag coated dielectric tapes after sintering the MLCC at approximately 940 C for approximately five hours.

FIGS. 8A-8C illustrate cross-sectional metallurgical microstructure views produced by a scanning electron microscope (SEM) of a second sample MLCC using Ag coated dielectric tapes after sintering the MLCC at approximately 940 C for approximately five hours.

FIGS. 10A-10C illustrate cross-sectional metallurgical microstructure views produced by a scanning electron microscope (SEM) of a third sample MLCC using Ag coated dielectric tapes after sintering the MLCC at approximately 975 C for approximately one hour.

FIGS. 12A-12C illustrate cross-sectional metallurgical microstructure views produced by a scanning electron microscope (SEM) of a fourth sample MLCC using Ag coated dielectric tapes after sintering the MLCC at approximately 975 C for approximately one hour.

FIGS. 13A-13D illustrate cross-sectional metallurgical microstructure views produced by an optical microscope of other fourth sample MLCCs corresponding to the sample MLCC of FIGS. 12A-12C.

DETAILED DESCRIPTION

Figure 1A:
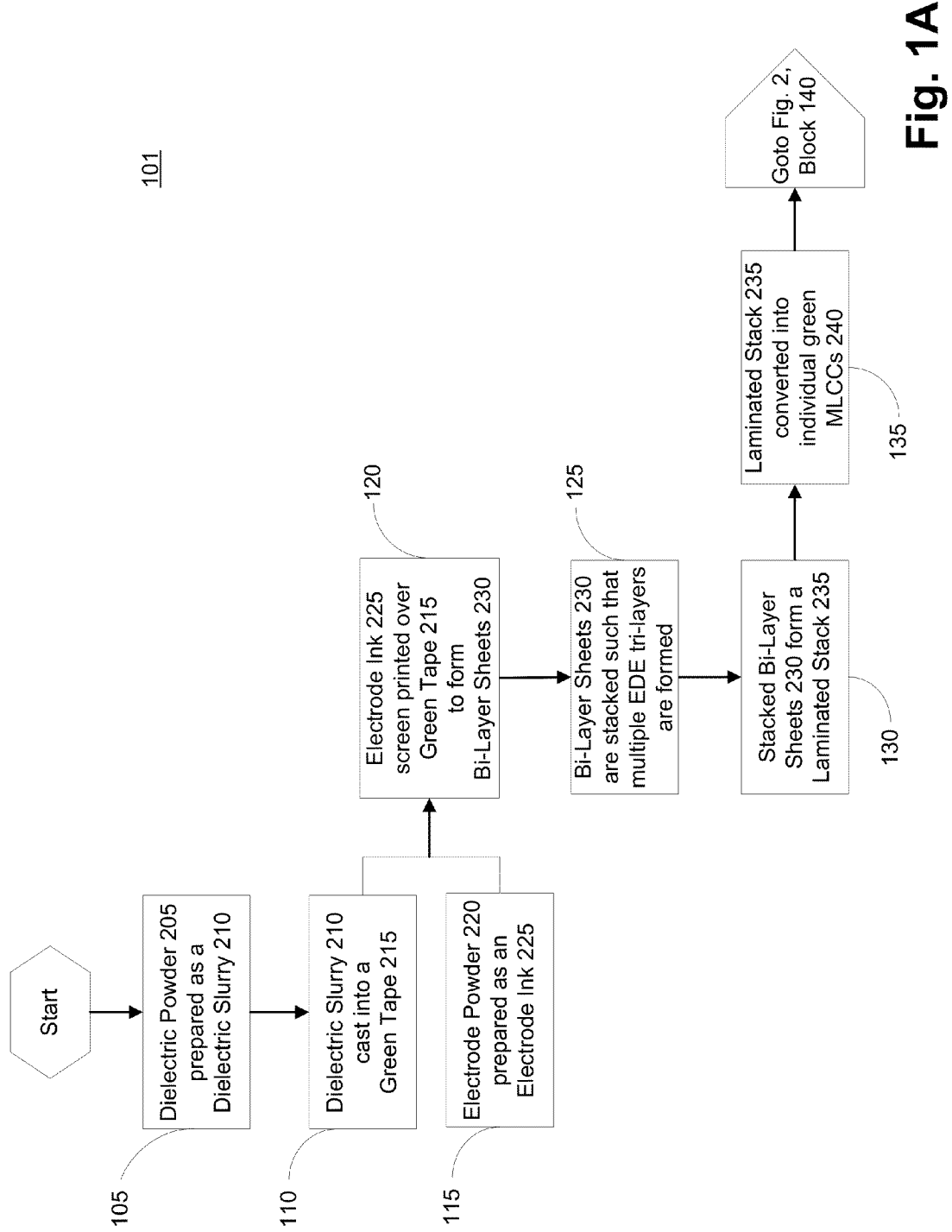

The presently disclosed embodiments, as well as features and aspects thereof, are directed towards providing a capacitor, and methods of manufacture, for improving capacitance efficiency. More specifically, an improved capacitor may be constructed with electrode layers having three-dimensional aspects at the point of interface with a dielectric. Advantageously, embodiments of a three-dimensional capacitor drastically reduce the space footprint that is required in a circuit to accommodate the capacitor, when compared to current capacitor designs known to one of ordinary skill in the art. Increased capacitive density can be realized without necessarily requiring high k (high constant) dielectric materials, additional "electrode-dielectric-electrode" arrangements in an ever increasing stack, or serially stringing together multiple capacitors.

In some embodiments, a capacitor, such as an MLCC, is disclosed that includes one or more metalized dielectric layers, each of which is disposed between two electrodes adapted for coupling to voltage terminals. It has been discovered that a significant amount of metal can be incorporated within a dielectric layer while ensuring that the incorporated metal forms separate metallic inclusions that do not form a percolation network. In fact, in some cases, the volume fraction of the incorporated metal can exceed the percolation threshold without leading to the occurrence of percolation.

For example, in some embodiments, the volume fraction of the metal in the dielectric layer can be at least about 40%. Further, in some embodiments, a depletion dielectric layer (i.e., a dielectric layer that is substantially, and preferably entirely, free of the metal) separates the metalized dielectric layer from at least one, and preferably, both electrodes between which the metalized layer is disposed. In this manner, capacitors exhibiting a high capacitance, and as well as high capacitive densities, can be achieved.

Exemplary embodiments of MLCCs are disclosed herein in the context of ceramic based capacitors, however, one of ordinary skill in the art will understand that various embodiments of a MLCC may not necessarily comprise ceramic based components and, as such, the scope of the present disclosure will not be limited to ceramic based embodiments. Moreover, the dielectric, anode and cathode layers of the disclosed embodiments may at times be generally referred to herein as "plates" or "layers." However, the present disclosure shall not be interpreted such that the conductive or dielectric layers must be "rigid" or "stiff" plates in all embodiments of a three-dimensional capacitor. Rather, the term "plate," as taken in context with a particular exemplary embodiment being conveyed, will be understood to include any component layer, or method of creation thereof, including rigid plates or plates created from the application of inks, paste, mechanics of deformable bodies, etc. That is, it will be understood that the term "plate" simply refers to a particular layer within a three-dimensional capacitor, such layer limited only by the features and aspects that may be described relative to the disclosure of the exemplary embodiments with which it is associated.

Generally, the particular embodiments described in the present disclosure are offered for illustrative purposes only and will not be construed to limit the scope of MLCC. Moreover, while various embodiments of a MLCC may utilize different component or material choices, the exemplary materials described relative to the illustrative embodiments in the present disclosure are not intended as a comprehensive listing of materials or components that may be included within a MLCC. Materials used to create the MLCCs and, in particular, the features of capacitor such as the anode layer, cathode layer, terminals, conductive protrusions, dielectric or "green tape" layer, may vary from one embodiment to another (e.g., based on particular applications for which the capacitor is intended) and, although perhaps serving to generate a novel feature or aspect of a certain embodiment, will not limit the scope of the disclosure.

Material choices for the various components or features of a given three-dimensional capacitor include, but are not limited to: for the electrodes—silver (e.g., about 100% percent by weight), silver palladium alloy (such as about 95% Ag to about 5% palladium percent by weight), palladium, and other precious metals such as, but not limited to, gold, platinum, iridium, and their alloys, as well as refractory metals such as, but not limited to, tungsten, molybdenum, tantalum, niobium, hafnium, and rhenium, and base metals such as, but not limited to, nickel, nickel alloy, copper and copper alloys; for the dielectric layer: ceramic and glass-ceramic, precious metal coated ceramics such as, but not limited to, silver-coated ceramics, palladium-coated ceramics, silver palladium coated ceramics, etc. as well as silver coated formulated barium titanate based dielectrics, silver coated glass beads, and inorganic oxides such as, but not limited to, alumina and tantalum oxide.

Turning now to the figures, where like reference numerals represent like elements throughout the drawings, various aspects, features and embodiments of exemplary three-dimensional capacitors and methods of manufacture will be presented in more detail. The examples as set forth in the drawings and detailed description are provided by way of explanation and are not meant as limitations on the scope of a MLCC, and in particular, a three-dimensional capacitor.

Methods for making a three-dimensional capacitor or the specific materials of construction that may be included within a three-dimensional capacitor are described. A MLCC, such as a three-dimensional capacitor, thus includes any modifications and variations of the following examples that are within the scope of the appended claims and their equivalents as understood to one of ordinary skill in the art.

According to exemplary embodiments of MLCC, by using metal coated ceramic particles or a silver dielectric composite in place of uncoated ceramic particles in the dielectric layer, a modified manufacturing process is described that may be used to create MLCCs, such as a three-dimensional capacitor embodiment. Coated dielectric materials or a metal-dielectric composites or mixtures may be merged with an improved manufacturing method to render a MLCC.

Some embodiments of a three-dimensional capacitor include multi-layer ceramic capacitors (MLCC) or the like and, therefore, it will be understood that many of the embodiments of three-dimensional capacitor that are described and depicted in the present disclosure are intended to only represent a single "electrode-dielectric-electrode" arrangement (EDE) that may represent a single tri-layer within a MLCC.

FIGS. 1-2 collectively illustrate one exemplary manufacturing method 101 that may be used to generate a MLCC having EDE tri-layers according to an exemplary embodiment of the invention. Referring to FIG. 1, in the manufacturing process for a MLCC, a ceramic powder 205 is mixed (step 105) into a carrier such as, but not limited to, a compound which may contain a solvent, polymer resin and additives such as a dispersing agent, to form a ceramic slurry 210.

The ceramic slurry 210 is used to cast the "green ceramic tape" 215 in the tape casting step 110 of the process. The green tape 215, having been made from the ceramic powder slurry, will eventually function as a dielectric layer of a capacitor. Although the exemplary green tape is described above as being formed from a ceramic slurry, it will be understood that embodiments of the invention may include green tape components made from materials other than, or in addition to, ceramics such as, but not limited to, formulated barium titanate based dielectrics, glass ceramics such as, but not limited to, Ca—B—Si—O system glass ceramics used in low-temperature co-fired ceramics, and alumina glass ceramics used in high-temperature co-fired ceramics and various metal coated ceramics and inorganic oxides and compounds. The metal used for coating or mixing can include, but is not limited to, silver-palladium alloys (such as the percent by weight composition of silver palladium in the range of about 95% Ag and about 5% Pd, more preferably about 90% Ag and about 10% Pd, and most preferably about 70% Ag and about 30% Pd) as well as palladium, palladium alloys, platinum, platinum alloys, silver, silver alloys, gold, gold alloys and other precious metals and their respective alloys, such as, iridium, Rhodium, ruthenium, as well as base metals, such as, but not limited to, copper, nickel, iron, cobalt, manganese, titanium, zinc, and refractory metals such as, but not limited to, tungsten, molybdenum, zirconium, tantalum, and niobium.

Surface texturing of the green tape may also be made using a mechanical roller. For example, after rolling on top of the green tape, the texture on the roller may be transferred onto the green tape. Later, once cast, the green tape 215 advances in the exemplary process to be screen printed at step 120.

Prior to screen printing at step 120, an electrode metal powder 220 is mixed (step 115) with a carrier compound to form electrode ink 225. The electrode ink 225 is screen printed in step 120 onto the ceramic green tape 215 to form a single dielectric-conductive bi-layer of an eventual MLCC.

Step 120 is one main aspect of this inventive system and method as described below in connection with FIGS. 1C-13. A silver dielectric composite or mixture may be used in this screen printing step 120, also referred known to one of ordinary skill in the art as the "green tape stage." The silver dielectric composite may include a metal (e.g., silver) coated dielectric tape, a dielectric mixed with metal (e.g., silver) powder, metal (e.g., silver) coated ceramic particles, or any other ways to form a metal dielectric composite as understood by one of ordinary skill in the art. In some embodiments in which metal-coated ceramic particles are employed, the ceramic particles have a size in a range of about 0.01 micron to about 10.0 microns.

If a dielectric composite comprising dielectric particles mixed with a metal (i.e. silver) powder or metal (i.e. silver) coated dielectric tapes are used in place of the exemplary non-coated ceramic powder 205 described above in step 120, then the MLCCs illustrated in FIGS. 14-22, or FIG. 1C-13 may be formed. For example, in some embodiments, silver-coated ceramic particles may be employed. As discussed in more detail below, when certain processing parameters are employed, e.g., a sintering temperature in a range of about 850° C. to about 950° C. for silver coated ceramic particles, a portion of the metal migrates from a region in proximity to at least one of the electrodes to that electrode, thereby generating a depletion layer (i.e., a layer that is substantially free of the metal) in the proximity of that electrode. In some cases, the metal that has migrated to the electrode causes an increase in the surface layer of that electrode, e.g., in the form of finger-like protrusions, which can in turn enhance the capacitance of a capacitor to be formed through subsequent processing steps. In some embodiments, the electrode has at least one metal constituent in common with the metal incorporated into the dielectric to facilitate the migration of the metal in a thin composite metal-dielectric layer in proximity of the electrode to that electrode so as to generate a depletion layer.

As steps 105 through 120 are repeated, the multiple screen printed green tape sheets 230, each sheet comprising a single dielectric-conductive bi-layer, are stacked at step 125 such that EDE tri-layers are created via the repeated juxtaposition of a screen printed conductive layer with the bottom surface of the green tape of a subsequent sheet. The stack resulting from step 125 is laminated together at step 130 in a lamination process. The resulting laminated stack 235 is then converted at step 135 into individual ceramic green chips 240 include multiple interleaved EDE tri-layers.

In FIG. 1B, the method or method 101 continues with the individual ceramic green chips 240 being exposed to a firing process at step 140. In the firing process (step 140), the green ceramic chips 240 may be sent through a belt furnace or the like to cause the organics in the aforementioned slurries to be removed, thereby sintering the green ceramic chip 240 into a ceramic capacitor chip 245 comprising EDE tri-layers. The sintering temperature can be selected, e.g., based on the metal used to form the dielectric-conductive layer. Generally, the sintering temperature is sufficiently high to causes at least partially melting of the metal. By way of example, the sintering temperature can be in a range of about 750° C. to about 980° C. for silver coated ceramics, while about 1100° C. to about 1500° C. for nickel coated ceramic in base metal MLCC.

At step 150, the sintered ceramic capacitor chip 245 may then be metalized at each of two ends via dipping into a termination ink 250 that was mixed (step 145) from a conductive metal powder 255. The termination metallization provides internal connection between alternating conductive plates (anode to anode and cathode to cathode) as well as electrical contact points for circuit board applications. The terminated chips 260 are then dried and fired again at step 155 in a termination firing process to become a MLCC 265. In some embodiments, the firing temperature can be, e.g., in a range of about 750° C. to about 900° C. Finally, at step 160, tin plating may be applied to the MLCCs 265 in a plating process to protect the termination metallization and provide for ease of soldering connections. As is known to one of ordinary skill in the art of manufacturing, the MLCCs 265 may then go through a testing process at step 165 for quality control prior to employment in a circuit (step 170).

Modified Manufacturing Process Coupled with Unique Component Selection for Constructing the 3-D Capacitors of FIGS. 1C-13: Metal Coated Dielectric Tapes or Slurries with Printed Coatings Post-Sintering View of an Actual Sample Using Metal Coated Dielectric Tapes: FIG. 1C

Figure 1C:
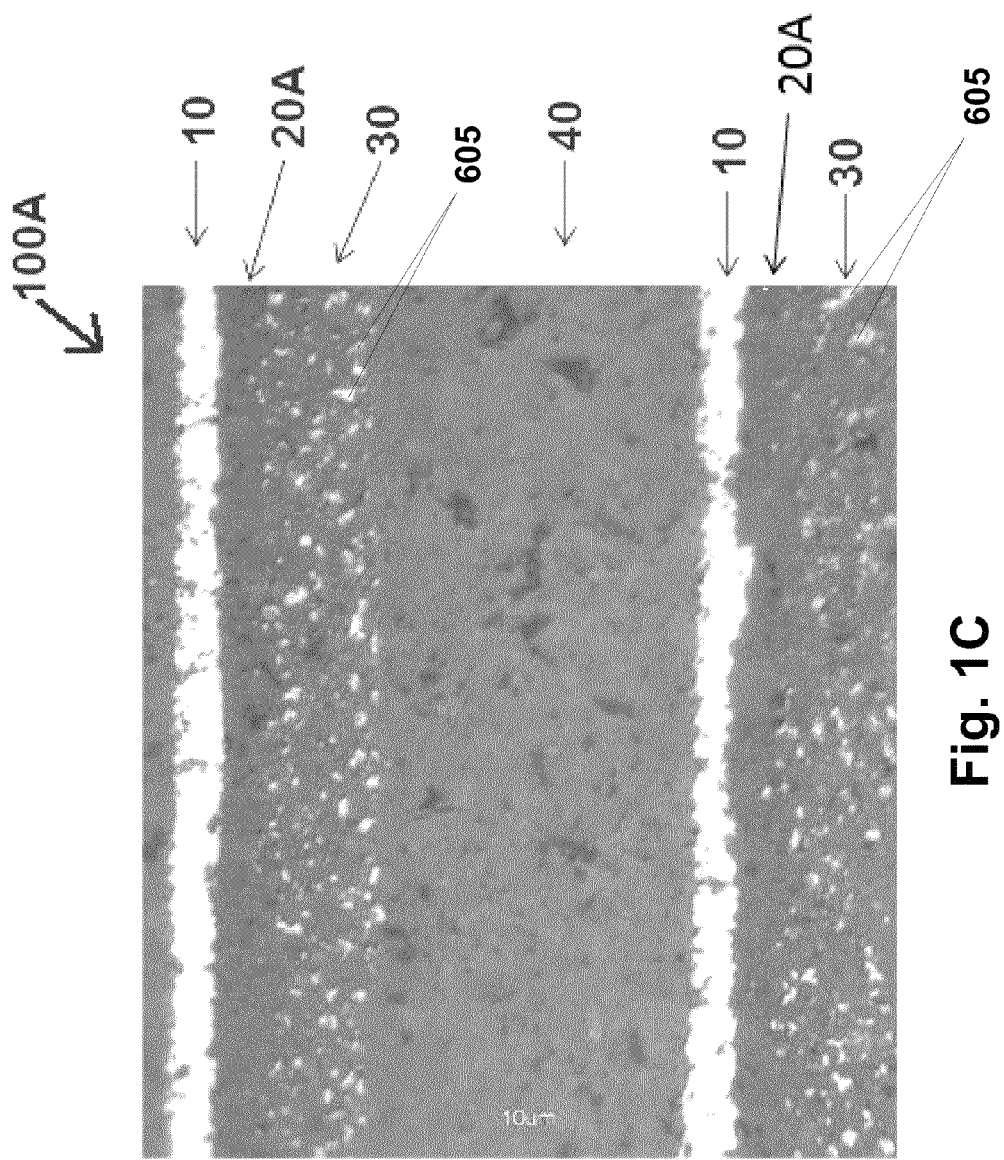
FIG. 1C illustrates a cross-sectional metallurgical microstructure view of a MLCC produced when a metal coated dielectric tape is used in the method of FIG. 1.

Referring now to FIG. 1C, this figure illustrates a cross-sectional view of a MLCC 100A produced when a silver coated dielectric tape 30 is used in the method of FIG. 1A-1B. This figure was produced using a scanning electron microscope at a magnification level of approximately 1000 times. The MLCC 100A comprises several layers: an metal electrode layer 10, a dielectric layer 20A (herein also referred to as depletion layer 20A), a metal-dielectric tape layer 30 (herein also referred to as metalized dielectric layer 30), and a dielectric layer 40. The dielectric layer 40, in some embodiments, may have a thickness that is greater than the thickness of the depletion layer 20A, e.g., in this example by about six times. Also visible are pockets or inclusions of metal 605 that migrates during sintering. It is noted here that the dielectric layer 20A is formed in-situ from the silver migration out of the silver-dielectric layer 30.

The following are exemplary materials used to form this MLCC structure 100. The electrode layer 10 comprises a 95/5 Ag/Pd (approx. 95% silver with approx. 5% palladium). The dielectric layer 40 may comprise a low temperature firable COG type titanate dielectric, sold as a commercially available product under the product name of VLF-220Aq3 manufactured by MRA Laboratories, and the metal-dielectric (i.e. Ag-dielectric) composite tape layer 30 may comprise an approximately 30% (by weight) silver coating of VLF-220Aq3. The sintering temperature may range from about 940° C. to about 975° C. The size of the capacitor chips may include sizes like 2018 (approx. 0.20 inches by approx. 0.18 inches). Typically, six active layers are used to make the capacitor chips. Typical dielectric layer thickness is about 0.001 inch (about 25 microns). Other sizes may be included which are within the scope of the invention.

Referring now to FIG. 1C which is a cross-sectional view produced by an electron microscope after sintering, the capacitor 100A may be constructed by printing an Ag/Pd electrode 10 on top of Ag-dielectric composite tape 30 and the Ag-dielectric composite tape 30 is insulated by the dielectric layer 40. The dielectric layer 40 may have a thickness of about thirty microns; while the Ag-dielectric composite tape 30 has a thickness of about ten microns after sintering.

In the scanning electron microscopic image, FIG. 1C, the lighter shaded materials are metal, Ag/Pd in electrode 10, and Ag in Ag-dielectric composite layer 30. The dark background shaded areas comprise the dielectric. A dielectric layer 20A, formed during the sintering process by the migration of silver in Ag-dielectric composite to the electrode 10, having a thickness of about five microns, may be seen clearly between the Ag/Pd electrode 10 and the remaining Ag-dielectric composite layer 30. Within the Ag-dielectric composite tape 30, inclusions or pockets of metal 605 are observed. An approximate increase of about five times (500%) is observed when comparing the capacitance of capacitor 100A to the capacitance of a control capacitor having the same dimensions and materials made only with pure dielectric tapes and without incorporation of metal in the dielectric.

Figure 2A:
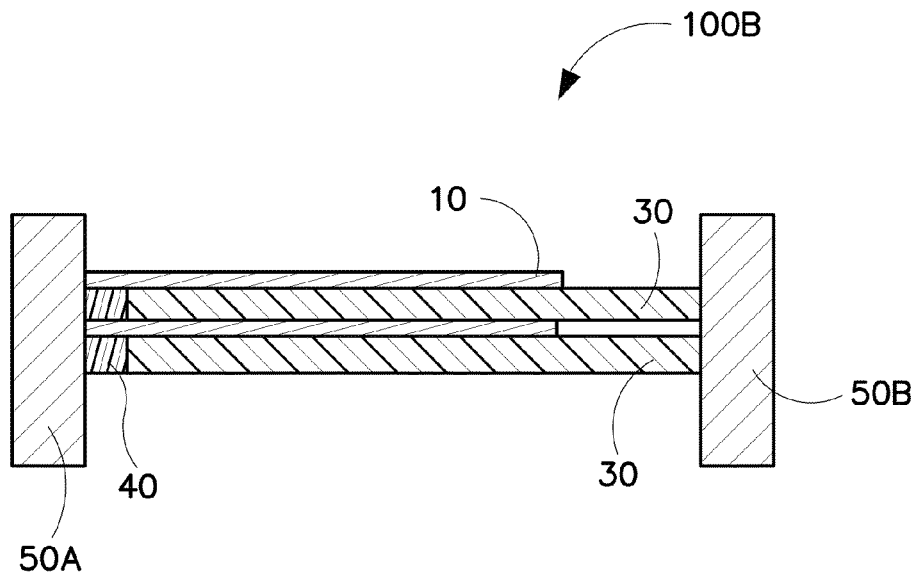
FIG. 2A illustrates a configuration of a MLCC prior to sintering.

Pre-Sintering Views: Exemplary Layer Designs Using Metalcoated Dielectric Tapes—FIGS. 2A-5A Referring now to FIG. 2A, this figure shows another exemplary capacitor structure 100B that may be formed using only the Ag-dielectric composite tape 30 without any dielectric layer 40. Specifically, FIG. 2A illustrates a configuration of a MLCC 100B prior to sintering. FIG. 2A shows the configuration of the capacitor 100B at the green stage before sintering (Steps 130-135, FIG. 1A). In FIG. 2A, the Ag/Pd electrode 10 is printed onto the Ag-dielectric composite tape 30 directly. The Ag-dielectric composite tape 30 is insulated electrically at one of its ends relative to a termination 50A. The terminations 50A, 50B may be made from materials that include, but are not limited to, silver.

Figure 2B:
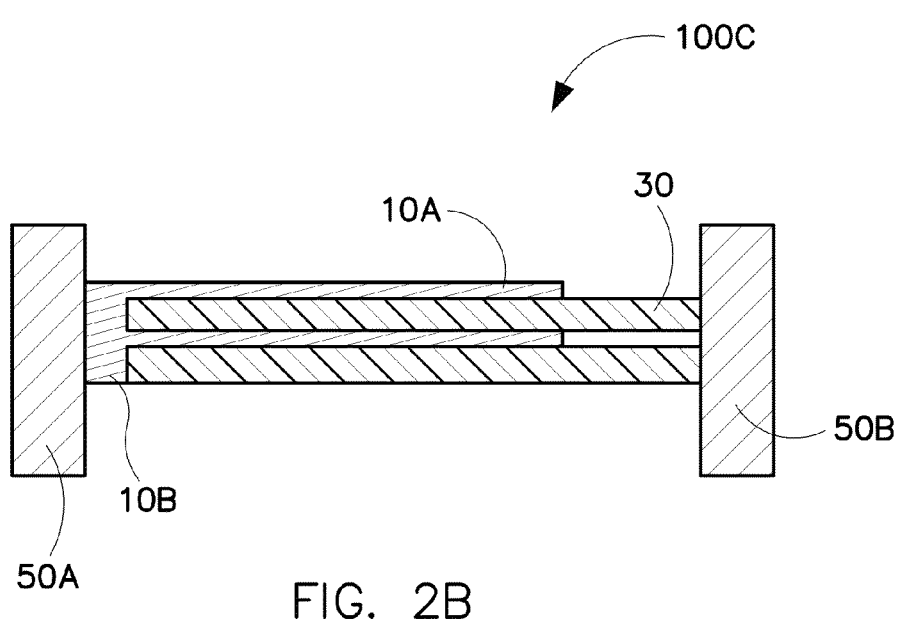
FIG. 2B illustrates a configuration of a MLCC with insulation at its ends comprised of a dielectric.

Insulation at one of the ends of the Ag-dielectric composite tape 30 may comprise a dielectric 40 or an air-filled cavity (not illustrated) formed by fugitive inks. Insulation may also be formed using the Ag/Pd electrode 10B during sintering as illustrated in FIG. 2B. In other words, FIG. 2B illustrates a configuration of a MLCC 100C with insulation at its ends comprising an Ag-dielectric composite tape 30.

The dielectric layers 20A described in connection with FIG. 1C have not formed yet at this stage in FIG. 2B as illustrated in this intermediate stage or phase of the method. Upon sintering, the silver in the Ag-dielectric composite tape 30 migrates and forms a dielectric layer 20A (shown in FIG. 1C) in-situ within the dielectric composite tape 30. The electrode layer 10 and the Ag-dielectric composite tape 30, together with the dielectric layer 20A formed during sintering as shown in FIG. 1A, may form the capacitor structure 100C of FIG. 2B. Note that two dielectric layers 20A (not shown in this FIG. 2B) may be formed in each Ag-dielectric composite tape 30.

Figure 2C:
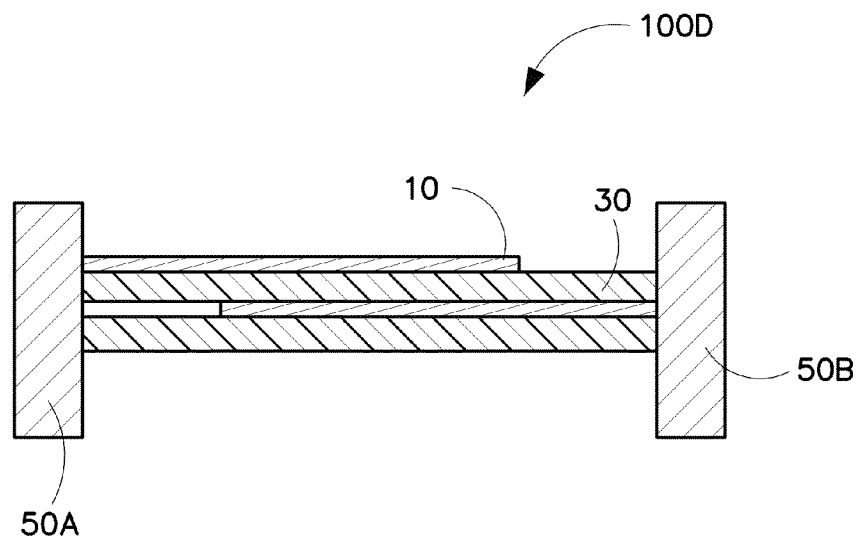
FIG. 2C illustrates a comparative example of a MLCC in which the Ag-dielectric composite is electrically shorted.

FIG. 2C illustrates a comparative example of a MLCC 100D in which the Ag-dielectric composite 30 is electrically shorted. Specifically, FIG. 2C shows a comparative example of a capacitor structure 100D, in which all the Ag-dielectric composite layer 30 is electrically short relative to the embodiments of FIGS. 2A and 2B, when no dielectric insulation 40 or cavity is used at one end of the Ag-dielectric composite tape 30 near termination 50A. However, shorting of electrical currents that typically pass through the Ag-dielectric layer 30 may be prevented if silver migration is permitted or promoted to occur effectively during the termination process when terminations 50 are added. This exemplary embodiment of FIG. 2C also illustrates a pre-sintering stage which means that the dielectric layers 20A (as illustrated in FIG. 1) have not been formed yet.

Paste can be used to form the Ag-dielectric composite layer 30, instead of Ag-dielectric composite tape 30. The Ag-dielectric composite layer 30 usually has to be thick enough to make sure that silver-dielectric layer has sufficient metal material to form an electrode within the layer 30 after silver migration occurs during the sintering stage for the capacitor structure 100. Typical thickness of the Ag-dielectric composite layer 30 for this embodiment of FIG. 2C generally includes magnitudes of about ten microns as stated in the description of FIG. 1C.

It is understood by one of the ordinary skill in the art that the in-situ formed dielectric layer thickness is not only affected by the printed layer thickness, but also influenced by other factors, such as, sintering temperature, and the chemistry of the dielectric and the nature of the metal used to form the metal-dielectric composite. It is also understood that the thickness given here should not be used as a limiting factor, and that the thinner the in-situ formed dielectric layer generally results in higher or increased capacitance performance.

Figure 3:
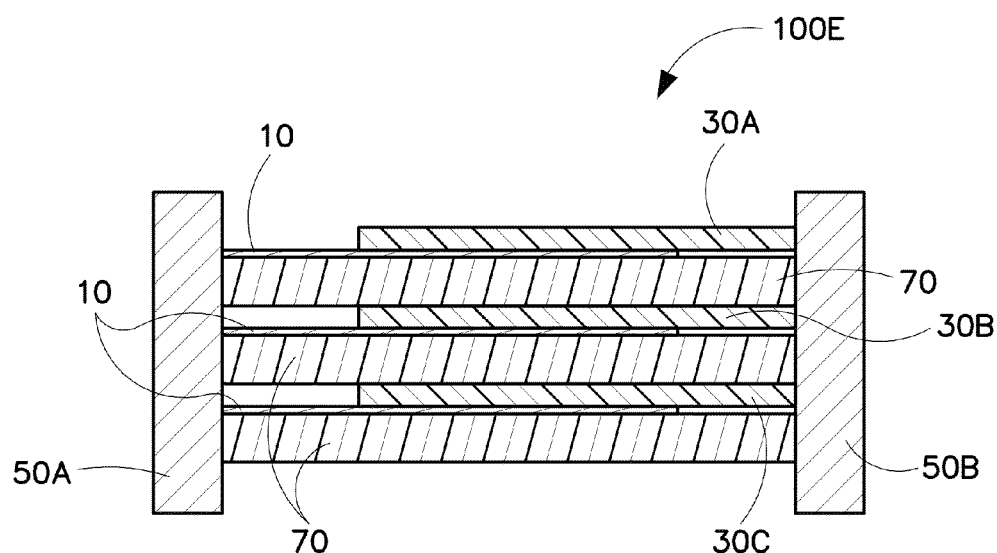
FIG. 3 illustrates a MLCC with an asymmetric layout in which both the electrode and Ag-dielectrics are printed on a surface of a dielectric tape.

FIG. 3 illustrates a MLCC 100E with an asymmetric layout in which both the electrode 10 and Ag-dielectrics 30 are printed on a surface of a dielectric tape 70. Specifically, FIG. 3 illustrates another exemplary embodiment of a capacitor structure 100E, in which both the electrode 10 and the three Ag-dielectric layers 30A, 30B, and 30C are printed on top of a dielectric tape 70. In this configuration, two types of sub-capacitor structures may be formed which have different dielectric layer thicknesses.

FIG. 3 shows the capacitor configuration at the green stage before sintering, therefore, the dielectric layer 20A formed during sintering, as shown as in FIG. 1, has not formed yet. One sub-capacitor structure is formed after sintering between the Ag/Pd electrode 10 and an adjacent printed first Ag-dielectric composite 30A. Here the remaining Ag-dielectric 30A is one electrode and the Ag/Pd 10 is the other electrode, together with the dielectric layer 20A (not shown) formed in-situ as the dielectric depletion layer to form the thin capacitor structure. The other capacitor structure is formed after sintering between the Ag/Pd electrode 10 and a second printed Ag-dielectric composite 30B across to the dielectric tape layer 70. It is clear that the first capacitor sub-structure has much higher capacitance due to the thinner layer of dielectric formed in-situ, than the second type which is a conventional structure.

The printed first, second, and third Ag-dielectric composites 30A, 30B, 30C are different from the Ag-dielectric composite tape 30 of the embodiment of FIG. 2C in the way these materials are formed during their respective component manufacturing. The Ag-dielectric composite tape 30 of FIGS. 2A, 2B, and 2C is formed by tape casting from a slurry, while the printed first Ag-dielectric composites 30A, 30B, and 30C are formed by printing from a paste. The functional material, Ag-dielectric composite powder, may be the same. Once each capacitor 100D (FIG. 2C) and 100E (FIG. 3) is formed, the composite tape 30 and composites 30A, 30B, and 30C function similarly with respect to the operation of the overall capacitor 100D, 100E.

Figure 4:
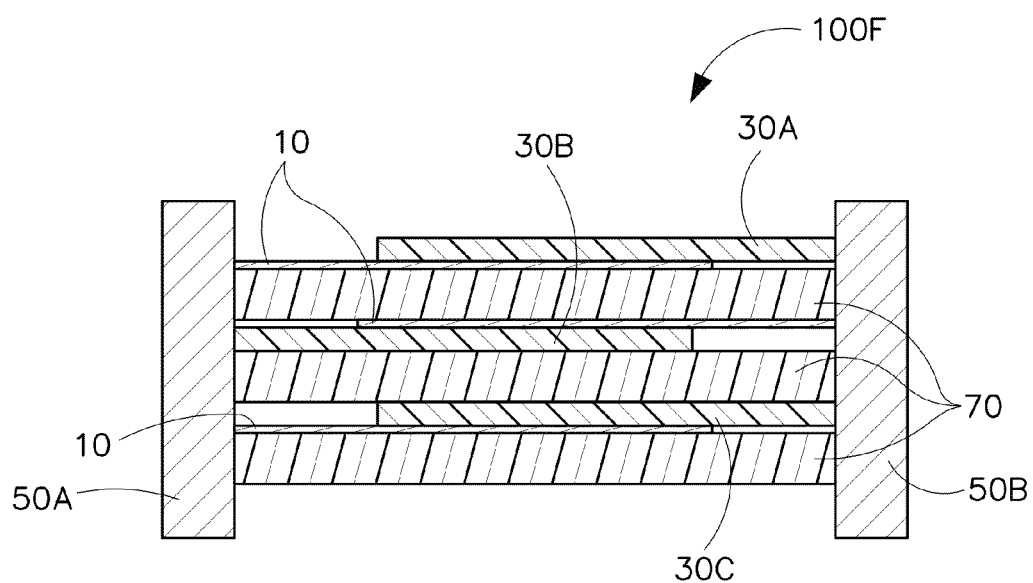
FIG. 4 illustrates a symmetric layout and pre-sintering stage of a MLCC relative to the asymmetric layout of the exemplary embodiment of FIG. 3.

FIG. 4 illustrates a symmetric layout and pre-sintering stage of a MLCC relative to the asymmetric layout 100E of the exemplary embodiment of FIG. 3. Specifically, in this exemplary embodiment of FIG. 4, the Ag-dielectric composites 30A, 30B, 30C (formed from a paste) are positioned in an alternating fashion relative to the terminations 50A, 50B. Since FIG. 4 schematically illustrates a pre-sintering stage, dielectric layers 20A (illustrated in FIG. 1) have not been formed.

Meanwhile, in the exemplary embodiment of FIG. 3, the Ag-dielectric composite layer 30 is only in contact with one of the terminations 50B.

Figure 5A:
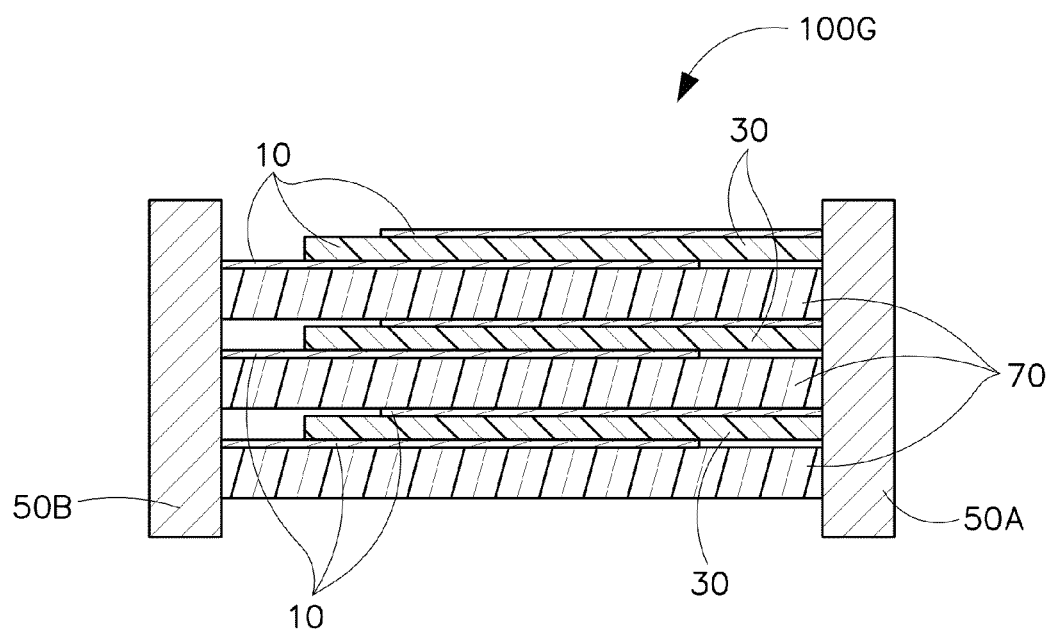
FIG. 5A illustrates an exemplary MLCC before sintering in which dielectric layers have not been formed yet.

FIG. 5A illustrates an exemplary MLCC 100G before sintering in which dielectric layers 20A have not been formed yet. Specifically, FIG. 5A depicts another exemplary capacitor structure 100G at the green stage before sintering which means that dielectric layers 20A (illustrated in FIG. 1C) have not been formed yet. In this exemplary embodiment, both the Ag-dielectric composites 30A, 30B, 30C (formed from a paste) and the Ag/Pd electrode 10 are printed on top of the dielectric tape 70. The Ag-dielectric composites 30A, 30B, 30C are printed larger relative to the area of the Ag/Pd electrode 10 in order to prevent shorting of electrical currents. In this exemplary embodiment of FIG. 5A, surface area of the composites 30A, 30B, 30C relative to the surface area of the electrode 10 are about 20% larger. The capacitor structure 100G also has dielectric tape layers 70 which are made of the same material as the ones illustrated in FIG. 3.

Figure 5B:
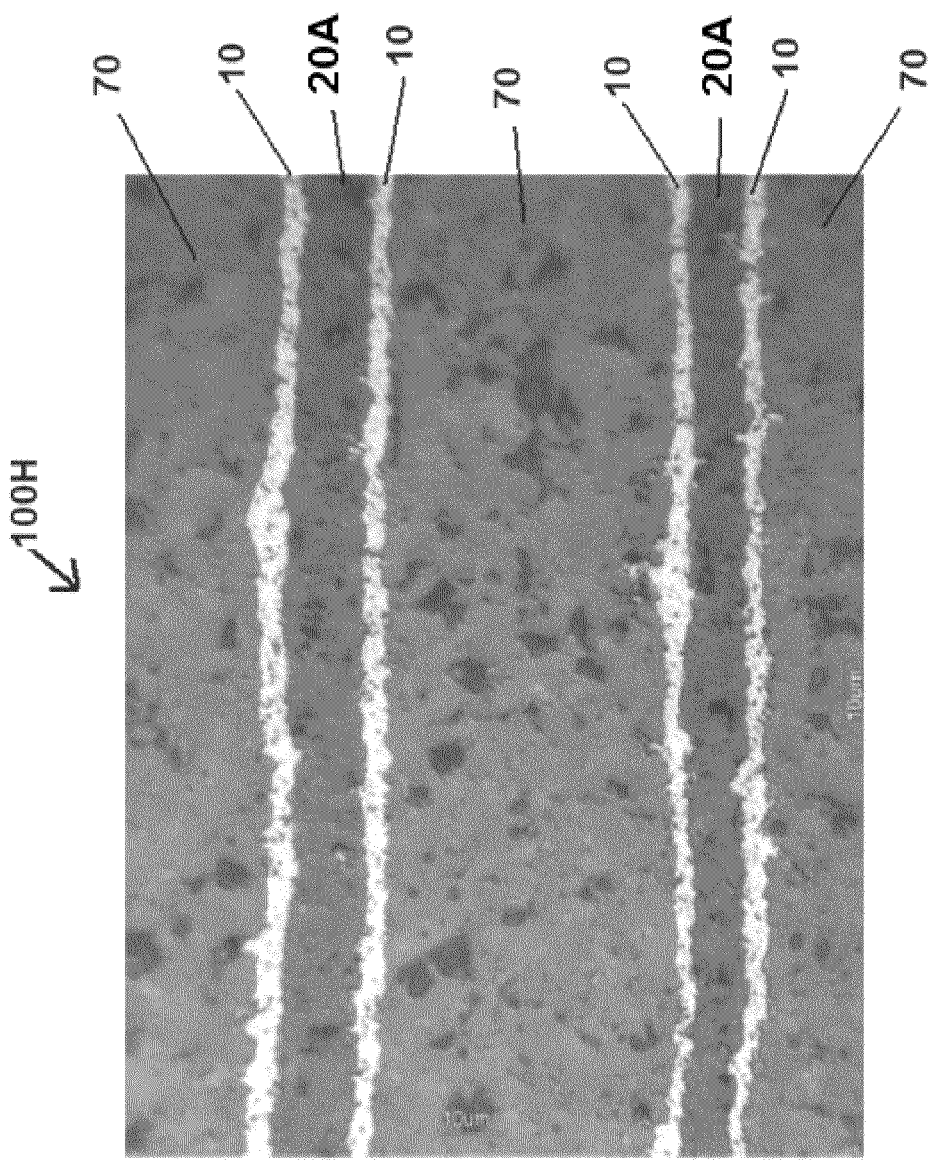
FIG. 5B illustrates a cross-sectional metallurgical microstructure view of an exemplary MLCC after sintering.

Post Sintering View: Layer Designs of an Actual Sample Using Metalcoated Dielectric Tapes—FIG. 5B FIG. 5B illustrates a cross-sectional view of an exemplary MLCC 100H after sintering. Specifically, FIG. 5b shows the capacitor structure 100H after sintering. FIG. 5b is a cross-sectional view produced by an optical microscope and illustrates an exemplary embodiment of a capacitor structure 100H in which the silver in the printed Ag-dielectric composite 30 (formed from paste as illustrated in pre-sintering stages of FIGS. 2A-5A) that is printed on dielectric tapes 70 is permitted to completely migrate into the electrode 10 in order to form the dielectric layers 20A in-situ during sintering. In FIG. 5B, the lighter shaded material is the Ag/Pd electrode material 10, while the dark background shaded material are the dielectric layers 70 and 20A.

As shown in FIG. 5B, silver in the Ag-composite layer 30 (as illustrated in pre-sintering FIGS. 2A-5A) completely migrates or moves to the electrode layer 10 to form layer 20A and the resultant capacitor structure. "In situ" as used in this description means "during sintering." An increase of about six times (about 600%) of capacitance is observed when comparing this capacitor structure 100G and 100H to a conventional capacitor having the same size and formed of the same materials for the electrodes and the dielectric layer that does not have the printed thin capacitor formed from silver migration during sintering. It is also noted that the dielectric breakdown voltage usually does not degrade due to the thin dielectric layer.

In the above described exemplary embodiments, the increase in the capacitance is usually due to the formation of thin dielectric layer 20A after silver migration from the Ag-dielectric composite 30. However, the migration of silver to the electrode 10 also creates opportunities to form an uneven surface at the electrode/dielectric interface. The rough surface usually increases the surface area of the electrode 10 and may contribute to the increase in capacitance.

These changes which cause the uneven surface at the electrode/dielectric interface may be affected by the sintering temperature. In the exemplary embodiments of the capacitors illustrated in FIGS. 1C-5, an increase of about ten percent in capacitance has been observed when the capacitors 100 are fired at lower temperature.

It should be pointed out that a capacitor 100 (G&H) may also be simply made by replacing the Ag-dielectric composite 30—with a pure dielectric. This is equivalent to when the silver percentage approaches zero in the Ag-dielectric composite 30. In the above exemplary embodiments, silver is used as the metal in the Ag-dielectric composite 30. Other metals or alloys can be used for Ag-dielectric composite 30, such as, but not limited to, Ni and Ni/Cu in base metal MLCC, and Ag/Pd alloys used in precious metal multilayer ceramic capacitors (MLCCs). In some cases, the metal content in the Ag-dielectric composite 30 has to be high enough to form a conductive layer after migration. Factors which affect or impact the thickness of the in situ formed dielectric layer 20A, for example, dielectric layer 20A illustrated in FIG. 1C, dielectric layer 30 in FIG. 5B, are the melting point of the metal or alloy in the metal dielectric composite 30, sintering temperature, and the amount of metal content in the metal dielectric composite 30. The glass in the dielectric 40, or dielectric 70 may also have a significant impact on the thickness of the in situ formed dielectric layers 20A.

Post Sintering Views of Test Samples: Layer Designs Using Metalcoated Dielectric Tapes FIGS. 6-13

FIGS. 6-13 illustrated black and white photos of scanning electron microscope (SEM) and light microscopy views of four samples of MLCC layer designs using metal (i.e. —Ag) coated dielectric tapes. These Ag coated dielectric tapes are used to make up approximately ⅓ of the total dielectric thickness forming the layers of the MLCC. The other two thirds of each MLCC comprise normal dielectric tapes. In these samples, it was noted one layer that appears thinner was not contacted by a sheet of the Ag coated dielectric tape. This was done purposely to guard against the entire structure becoming conductive, as with other test samples that did not work/perform because the entire structure became conductive.

The cover layers of these sample MLCCs are also made from normal dielectric tapes. One hundred MLCC's designated (A) were processed so that the orientation remained the same, whereby the internal electrode was printed directly upon the Ag coated dielectric tape. These parts were burned out and sintered so that the Ag coated layers would face downward (toward the Al2O3 setter). Forty-eight MLCC's were processed so that each of the coated layers would face upward (away from the setter) during burnout and firing (label B). Each group (A and B) of the four samples illustrated in FIGS. 6-13 was sub-divided and fired using two profiles, 940 C/5 hr. sintering and 975 C/1 hr. sintering Observations of Samples Illustrated in FIGS. 6-13

There was a marked improvement in sintered microstructure for this design compared to prior samples referred to FIG. 2C. The 975° C./1 hr. sintering appears to be considerably denser than the 940° C./5 hr. profile.

In each sample illustrated in FIGS. 6-13, regardless of orientation during binder burnout and firing, the Ag in the coated tape portion of the dielectric layer 30 seems to actually migrate away from the 95Ag/5Pd internal electrode 10 which is an unexpected result to one of ordinary skill in the art, and appears to have minimal effect on electrical performance. This was unexpected because in some layers the Ag moved upward against the force of gravity. Meanwhile, one of ordinary skill in the art would expect the Ag to move downward because of the force of gravity.

Another observation of these samples illustrated in FIGS. 6-13 is that the Ag migration appears to stay largely within the coated tape dielectric layer 30 and congregates as what appears to be rather pure dielectric layer 20A. Silver in the silver-dielectric composite migrates into the electrode layer, and also migrates to form pockets 605 of Ag metal. These pockets 605 appear much more frequent in the faster profile sintering trial (LT-3088A, sint. 975 C/1 h—FIGS. 10-11 and LT-3088B, sint. 940 C/1 h FIGS. 12-13), but larger in size in the slower trial (LT-3088A, sint. 975 C/5 h—FIGS. 6-7 and LT-3088B, sint. 940 C/5 h FIGS. 8-9). Again, this suggests that much of the Ag is accumulating as pockets 605 of pure Ag. Another observation of these samples were that none of the samples cross-sectioned exhibited delaminations.

| Electrical results (approximately 1 kHz, 1 Vrms) | | |
|---|---|---|
| | 940° C./5 hrs. | 975° C./1 hr. |
| LT-3088A non-shorts | 7/50 | 50/50 |
| LT-3088B non-shorts | 4/24 | 19/24 |
| LT-3088A cap range (pico F) | 20.37-52.89 | 12.06-26.36 |
| LT-3088B cap range (pico F) | 36.26-70.10 | 18.60-24.24 |
| (A) effective dielectric constant | 84.76 | 42.67 |
| (B) effective dielectric constant | 113.5 | 39.24 |

The effective dielectric constant was calculated for the single part from each group that exhibited the largest capacitance. As understood by one of ordinary skill in the art, the effective dielectric constant is calculated based on the observed capacitance and the dimensions of the capacitor. Dielectric loss was measured at about 0.00% for each group, with the exception of LT-3088A sintered at 940° C./5 hrs. which ranged from about 0.00 to about 0.03%. Again, these ranges suggest minimal reaction between Ag and the normal dielectric portion of the effective layers.

Meanwhile, the normal dielectric constant (K) in MLCC form for this dielectric is typically about 23. K-squares were also made with this run (having no internal 95Ag/5Pd electrode layers, but containing the same layers of Ag coated dielectric as the MLCC's) and the measured K was found to be approximately 24.5. Again, this suggests that the Ag is largely non-reactive with the dielectric, and does not contribute much, if anything, to conduction in this form as understood by one of ordinary skill in the art.

Summary of Observations for Samples Illustrated in FIGS. 6-13 and Described in Further Detail Below:

A MLCC 3-D capacitor formed from metal-coated (i.e. Ag-coated) dielectric tapes appears to increase the effective dielectric constant K and capacitance of the entire MLCC significantly. In the single case of LT-3088B, as noted above, the increase appears to be approximately five times relative to a MLCC formed without any metal-coated dielectric tapes.

Detailed Description of Four Samples Illustrated in FIGS. 6-13

FIGS. 6-13 illustrate the four samples discussed above. Each sample uses the following reference numerals for its various layers: Ag electrode layer (10); dielectric layer (20A) formed between Ag electrode layer (10) and the Ag coated dielectric tape (30); pockets of Ag metal (605); and un-coated, standard/regular dielectric tape (70).

Specifically, FIGS. 6A-6C illustrate cross-sectional views produced by a scanning electron microscope (SEM) of a first sample MLCC 100-1 (LT-3088A) using Ag coated dielectric tapes 30 after sintering the MLCC 100-1 at approximately 940° C. for approximately five hours of soaking.

More specifically, FIG. 6A illustrates a SEM cross-sectional view of the first sample MLCC 100-1 at a magnification level of approximately 500 times. Several instances of the layers, including Ag electrode layers 10, dielectric layers 20A, and Ag coated dielectric tape layer 30 are present. Pockets of Ag metal 605 are also visible.

FIG. 6B illustrates a SEM cross-sectional view of the first sample MLCC 100-1 of FIG. 6A at a magnification level of approximately 2000 times. Several instances of the layers (but fewer than those illustrated in FIG. 6A) are visible, including Ag electrode layers 10, dielectric layers 20A, and Ag coated dielectric tape layer 30 are present. Pockets of Ag metal 605 are also visible.

FIG. 6C illustrates a SEM cross-sectional view of the first sample MLCC 100-1 of FIG. 6A at a magnification level of approximately 5000 times. Only the Ag coated dielectric tape layer 30 is visible. Pockets of Ag metal 605 formed within the dielectric tape layer 30 are also visible. As noted above, the pockets 605 of metal (i.e. —Ag) in this exemplary first sample MLCC 100-1 (and the second exemplary sample MLCC 100-2) having longer soak times are larger in size relative to the pockets 605 of the third and fourth sample MLCCs 100-3, 100-4 having longer soak times but are less frequent in number.

Figure 7A:
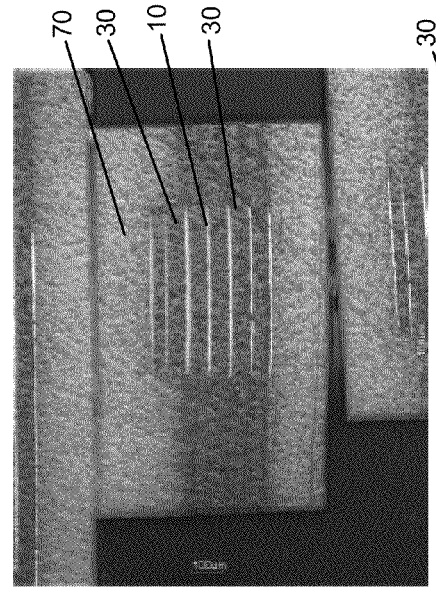
FIGS. 7A-7D illustrate cross-sectional metallurgical microstructure views produced by an optical microscope of other first sample MLCCs corresponding to the sample MLCC of FIGS. 6A-6C.
Figure 7B:
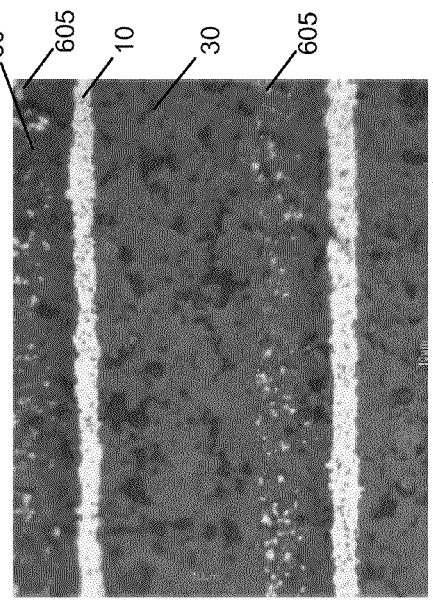
Figure 7C:
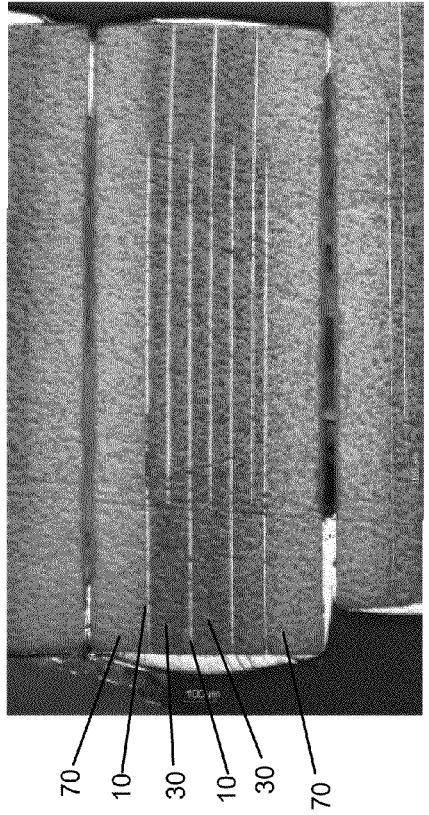

FIGS. 7A-7D illustrate cross-sectional views produced by an optical microscope of other sample first sample MLCCs 100-1 (LT-3088A) corresponding to the one illustrated in FIGS. 6A-6C. Specifically, FIGS. 7A-7C illustrate an optical microscope cross-sectional view of a first sample MLCC 100-1 at a magnification level of approximately 100 times. In FIGS. 7A-7C, several layers, including the Ag electrode layer 10; Ag coated dielectric tape (30); and un-coated, standard/regular dielectric tape (70) are visible. (The pockets or inclusions of metal 605 are not visible.) FIG. 7A illustrates a first embodiment of the first sample MLCC 100-1 while FIG. 7B illustrates a second embodiment of a first sample MLCC 100-1 and FIG. 7C illustrates a third embodiment of a first sample MLCC 100-1, where each embodiment was manufactured in the same batch or set of MLCCs 100.

Figure 7D:
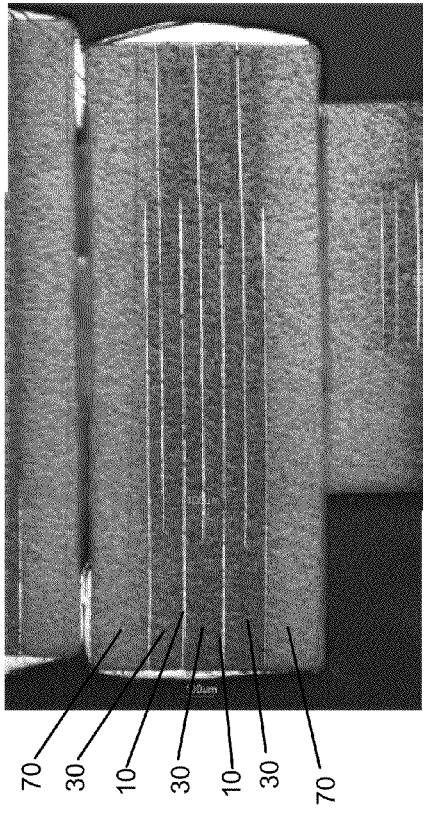

FIG. 7D illustrates an optical microscope cross-sectional view of a first sample MLCC 100-1 at a magnification level of approximately 1000 times. In this FIG. 7D, several layers including Ag electrode layers 10, dielectric layers 20A, and Ag coated dielectric tape layer 30 are present. Pockets of Ag metal 605 are also visible.

FIGS. 8A-8C illustrate cross-sectional views produced by a scanning electron microscope (SEM) of a second sample MLCC 100-2 (LT-3088B) using Ag coated dielectric tapes after sintering the MLCC at approximately 940 C for approximately five hours of soaking. More specifically, FIG. 8A illustrates a SEM cross-sectional view of a second sample MLCC 100-2 at a magnification level of approximately 500 times. Several instances of the layers, including Ag electrode layers 10, dielectric layers 20A, and Ag coated dielectric tape layer 30 are present. Pockets of Ag metal 605 are also visible.

FIG. 8B illustrates a SEM cross-sectional view of the second sample MLCC 100-2 of FIG. 8A at a magnification level of approximately 2000 times. Several instances of the layers (but fewer than those illustrated in FIG. 8A) are visible, including Ag electrode layers 10, dielectric layers 20A, and Ag coated dielectric tape layer 30 are present. Pockets of Ag metal 605 are also visible.

FIG. 8C illustrates a SEM cross-sectional view of the second sample MLCC 100-2 of FIG. 8A at a magnification level of approximately 5000 times. Only the Ag coated dielectric tape layer 30 is visible. Pockets of Ag metal 605 formed within the dielectric tape layer 30 are also visible. As noted above, the pockets 605 of metal (e.g., Ag) in this exemplary second sample MLCC 100-2 (and the first exemplary sample MLCC 100-1) having longer soak times are larger in size relative to the pockets 605 of the third and fourth sample MLCCs 100-3, 100-4 having longer soak times but are less frequent in number.

Figure 9B:
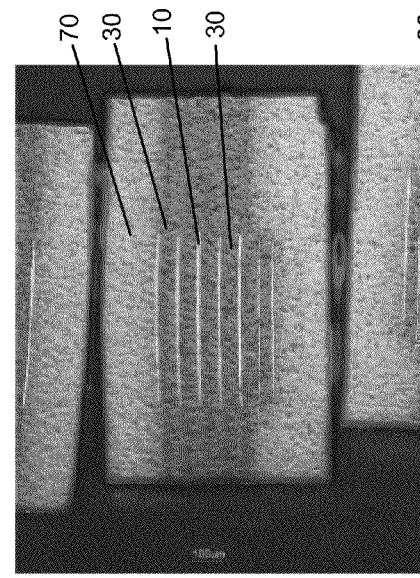
FIGS. 9A-9D illustrate cross-sectional metallurgical microstructure views produced by an optical microscope of other second sample MLCC corresponding to the sample MLCC of FIGS. 8A-8C.
Figure 9A:
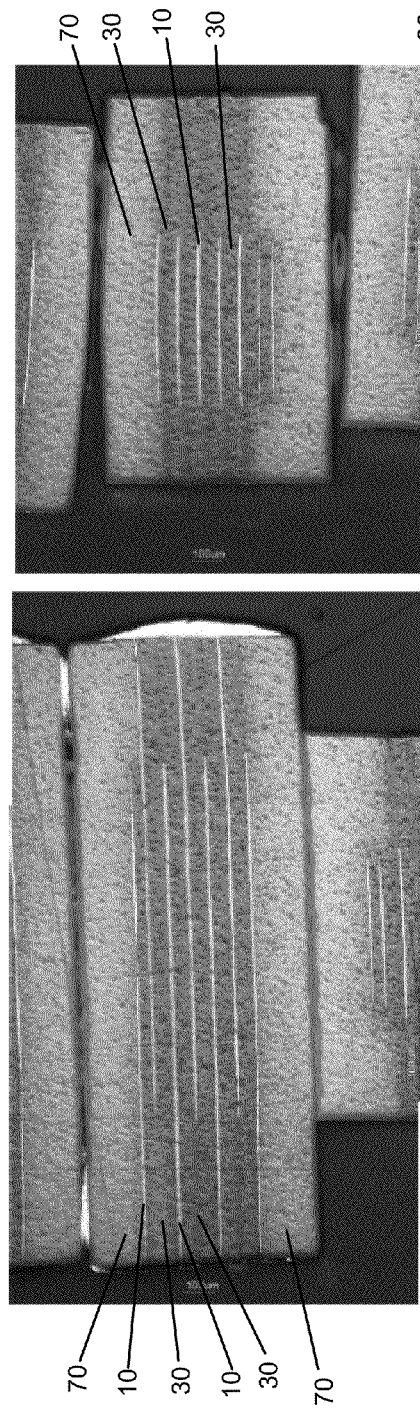
Figure 9D:
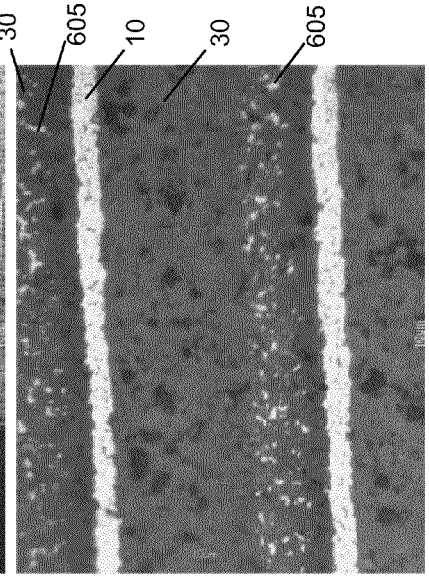
Figure 9C:
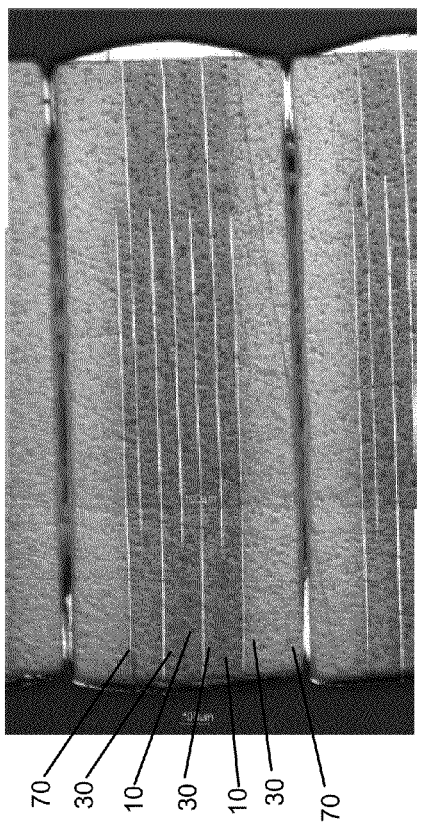

FIGS. 9A-9D illustrate cross-sectional views produced by an optical microscope of other second samples corresponding to the second sample MLCC 100-2 (LT-3088B) illustrated in FIGS. 8A-8C. Specifically, FIGS. 9A-9C illustrate an optical microscope cross-sectional view of second sample MLCC 100-2 at a magnification level of approximately 100 times. In FIGS. 9A-9C, several layers, including the Ag electrode layer 10; Ag coated dielectric tape (30); and un-coated, standard/regular dielectric tape (70) are visible. (The pockets or inclusions of metal 605 are not visible.) FIG. 9A illustrates a first embodiment of a second sample MLCC 100-2 while FIG. 9B illustrates a second embodiment of a second sample MLCC 100-2 and FIG. 9C illustrates a third embodiment of a second sample MLCC 100-2, where each embodiment was manufactured in the same batch or set of MLCCs 100.

FIG. 9D illustrates an optical microscope cross-sectional view of a second sample MLCC 100-2 (LT-3088B) at a magnification level of approximately 1000 times. In this FIG. 9D, several layers including Ag electrode layers 10, dielectric layers 20A, and Ag coated dielectric tape layer 30 are present. Pockets of Ag metal 605 are also visible.

FIGS. 10A-10C illustrate cross-sectional views produced by a scanning electron microscope (SEM) of a third sample MLCC 100-3 (LT-3088A) using Ag coated dielectric tapes 30 after sintering the MLCC 100-3 at approximately 975 C for approximately one hour of soaking. More specifically, FIG. 10A illustrates a SEM cross-sectional view of the third sample MLCC 100-3 at a magnification level of approximately 500 times. Several instances of the layers, including Ag electrode layers 10, dielectric layers 20A, and Ag coated dielectric tape layer 30 are present. Pockets of Ag metal 605 are also visible.

FIG. 10B illustrates a SEM cross-sectional view of the third sample MLCC 100-3 of FIG. 10A at a magnification level of approximately 2000 times. Several instances of the layers (but fewer than those illustrated in FIG. 10A) are visible, including Ag electrode layers 10, dielectric layers 20A, and Ag coated dielectric tape layer 30 are present. Pockets of Ag metal 605 are also visible.

FIG. 10C illustrates a SEM cross-sectional view of the third sample MLCC 100-3 of FIG. 10A at a magnification level of approximately 5000 times. Only the Ag coated dielectric tape layer 30 is visible. Pockets of Ag metal 605 formed within the dielectric tape layer 30 are also visible. As noted above, the pockets of Ag metal 605 appear much more frequent in this faster soaking sintering third sample MLCC 100-3 (and fourth sample 100-4), but are smaller in size relative to the slower soaking first and second sample MLCC 100-1, 100-2.

Figure 11B:
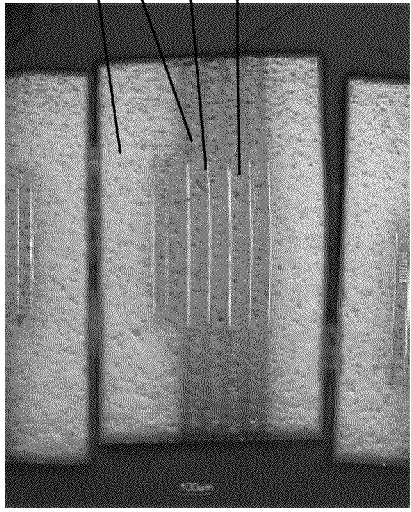
FIGS. 11A-11D illustrate cross-sectional metallurgical microstructure views produced by an optical microscope of other third sample MLCCs corresponding to the sample MLCC of FIGS. 10A-10C.
Figure 11D:
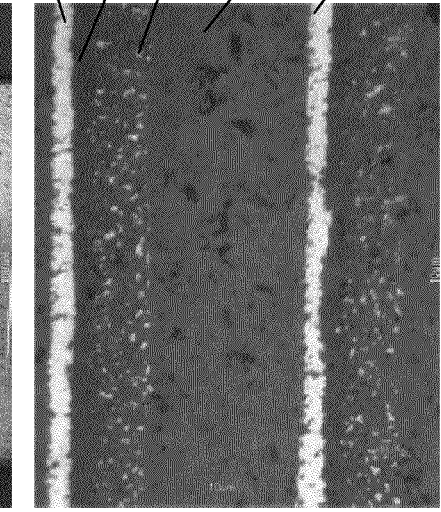
Figure 11A:
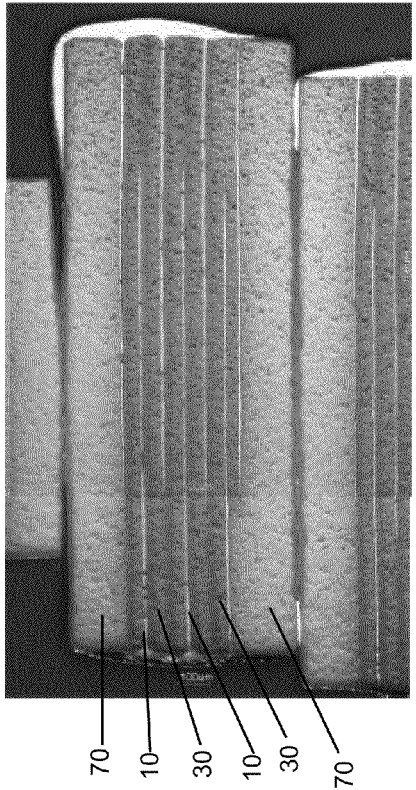
Figure 11C:
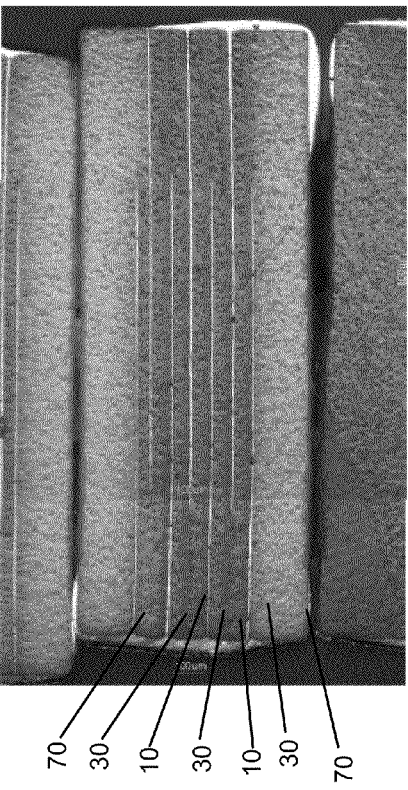

FIGS. 11A-11D illustrate cross-sectional views produced by an optical microscope of other third samples corresponding to the third sample MLCC 100-3 (LT-3088A) illustrated in FIGS. 10A-10C. Specifically, FIGS. 11A-11C illustrate an optical microscope cross-sectional view of a third sample MLCC 100-3 at a magnification level of approximately 100 times. In FIG. 11A, several layers, including the Ag electrode layer 10; Ag coated dielectric tape (30); and un-coated, standard/regular dielectric tape (70) are visible. (The pockets or inclusions of metal 605 are not visible.) FIG. 11A illustrates a first embodiment of third sample MLCC 100-3 while FIG. 11B illustrates a second embodiment of a third sample MLCC 100-3 and FIG. 11C illustrates a third embodiment of a third sample MLCC 100-3, where each embodiment was manufactured in the same batch or set of MLCCs 100.

FIG. 11D illustrates an optical microscope cross-sectional view of a third sample MLCC 100-3 at a magnification level of approximately 1000 times. In this FIG. 11D, several layers including Ag electrode layers 10, dielectric layers 20A, and Ag coated dielectric tape layer 30 are present. Pockets of Ag metal 605 are also visible.

FIGS. 12A-12C illustrate cross-sectional views of a fourth sample MLCC 100-4 using Ag coated dielectric tapes produced by a scanning electron microscope (SEM) after sintering the MLCC at approximately 975 C for approximately one hour of soaking. More specifically, FIG. 12A illustrates a SEM cross-sectional view of the fourth sample MLCC 100-4 at a magnification level of approximately 500 times. Several instances of the layers, including Ag electrode layers 10, dielectric layers 20A, and Ag coated dielectric tape layer 30 are present. Pockets of Ag metal 605 are also visible.

FIG. 12B illustrates a SEM cross-sectional view of the fourth sample MLCC 100-4 (LT-3088B) of FIG. 12A at a magnification level of approximately 2000 times. Several instances of the layers (but fewer than those illustrated in FIG. 12A) are visible, including Ag electrode layers 10, dielectric layers 20A, and Ag coated dielectric tape layer 30 are present. Pockets of Ag metal 605 are also visible.

FIG. 12C illustrates a SEM cross-sectional view of the fourth MLCC 100-4 sample of FIG. 12A at a magnification level of approximately 5000 times. Only the Ag coated dielectric tape layer 30 is visible. Pockets of Ag metal 605 formed within the dielectric tape layer 30 are also visible. As noted above, the pockets of Ag metal 605 appear much more frequent in this faster soaking sintering fourth sample MLCC 100-4 (and third sample 100-3), but are smaller in size relative to the slower soaking first and second sample MLCC 100-1, 100-2

FIGS. 13A-13D illustrate cross-sectional views produced by an optical microscope of other fourth samples corresponding to the fourth sample MLCC 100-4 (LT-3088A) illustrated in FIGS. 12A-12C. Specifically, FIGS. 13A-13C illustrate an optical microscope cross-sectional view of a fourth sample MLCC 100-4 at a magnification level of approximately 100 times. In FIGS. 13A-13C, several layers, including the Ag electrode layer 10; Ag coated dielectric tape (30); and un-coated, standard/regular dielectric tape (70) are visible. (The pockets or inclusions of metal 605 are not visible.) FIG. 13A illustrates a first embodiment of a fourth sample MLCC 100-4 while FIG. 13B illustrates a second embodiment of a fourth sample MLCC 100-4 and FIG. 13C illustrates a third embodiment of a fourth sample MLCC 100-4, where each embodiment was manufactured in the same batch or set of MLCCs 100.

FIG. 13D illustrates an optical microscope cross-sectional view of a fourth sample MLCC 100-4 at a magnification level of approximately 1000 times. In this FIG. 13D, several layers including Ag electrode layers 10, dielectric layers 20A, and Ag coated dielectric tape layer 30 are present. Pockets of Ag metal 605 are also visible.

Modified Manufacturing Process Coupled with Unique Component Selection for Constructing the 3-D Capacitors of FIGS. 14-22: Metal Coated Ceramic Particles By using metal coated ceramic particles in place of the exemplary non-coated ceramic powder 205 described above, the modified ceramic capacitor manufacturing method 101 may also be used to create three-dimensional capacitor embodiments.

Metal-coated ceramic powders featuring a continuous particulate coating such as, but not limited to, silver coated dielectrics are utilized in various embodiments of a three-dimensional MLCC. Silver coated glass beads are available as of this writing from Technic, Inc. of Woonsocket, R.I. and Potters Industries, Inc. of Malvern, Pa.

Typically, the metal coating of the metal-coated ceramic powder is consistent with the conductive powder that may be used to create an electrode layer such as, but not limited to, silver or silver-palladium alloy in the case of a precious metal MLCC and nickel or nickel alloys in the case of a base metal MLCC. In other embodiments, metal-coated ceramic powders having inconsistent, defective coatings can be employed. Moreover, although the particulate coating is substantially consistent in some metal-coated ceramic powders prior to the powder being incorporated into a given three-dimensional capacitor embodiment, defects in the continuity of the coating may occur during the process of mixing the metal coated ceramic particulates into pastes. Regardless of whether a coated particulate features a continuous, consistent coating or an inconsistent, defective coating, a coated particulate may be used to effectively form a dielectric layer of a three-dimensional capacitor embodiment.

Advantageously, because of the inherent surface tension between the metal coating and ceramic particulate substrate, discontinuity of the metal coating may occur as a result of exposure to a sintering temperature. One of ordinary skill in the art will understand that exposure of a metal-coated particulate to a given sintering temperature may cause the metal coating to flow from the particulate and aggregate in voids between neighboring particulate. The resulting aggregations of metal coating that has flowed from the surface of a dielectric particulate may settle into cavities between juxtaposed dielectric particulate and simultaneously contact an anode or cathode layer within the MLCC, thereby effectively creating a conductive extension of the anode or cathode layer that protrudes substantially perpendicularly from the electrode layer into the dielectric layer. Notably, and advantageously, multiple protrusions of aggregated metal coating serve to increase the capacitive density of the MLCC, without expanding the overall space footprint of the MLCC, by virtue of increasing the surface area attributable to the conductive layers. The thickness of the protrusion that may result from some aggregations of the metal coatings, after sintering, is believed to be between 1% and 90% of an overall particle thickness that ranges between about 0.001 microns and about 10 microns.

One of ordinary skill in the art will recognize that various manufacturing and material parameters can be leveraged to control the flow and aggregation of a conductive coating from a coated dielectric particulate and, therefore, even though particular process parameter setting combinations or material features may be novel, or render novel results, variations in process parameter settings or material features will not limit the scope of the present disclosure. Manufacturing parameters and material features that may be leveraged to affect the flow and aggregation of metal coating from metal-coated particulate include, but are not limited to, the metal coating percentage, the thickness of the dielectric layer, sintering temperature and sintering time.

Some embodiments of a three-dimensional capacitor may leverage dielectric material selection composed of core-shell ceramic particles. In some embodiments, the core in a core-shell ceramic particle may have the composition of BaTiO3 while the shells may be rich in dopants to modify the temperature coefficients of the capacitance. The composition distribution (core-shell structure) may provide a consistent dielectric constant over the required temperature range.

Figure 14:
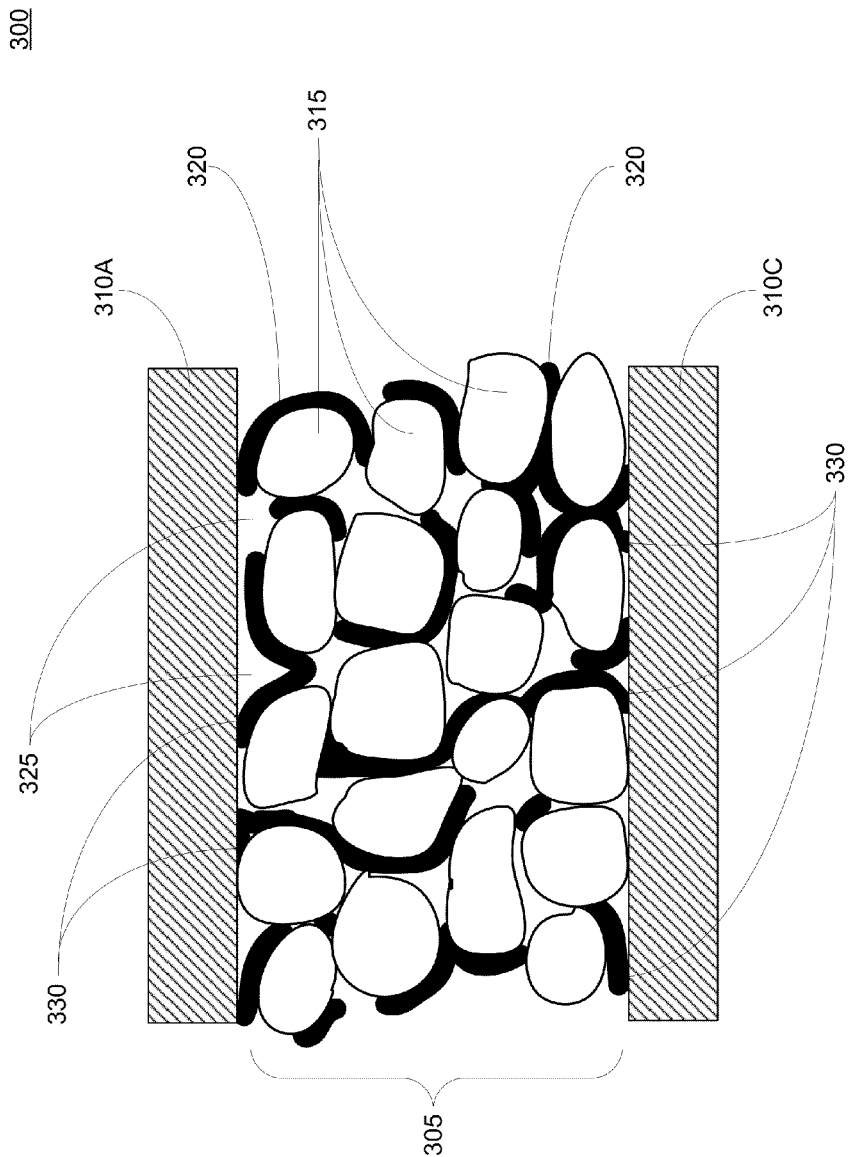
FIG. 14 illustrates a cross-sectional view of a single EDE tri-layer that forms one exemplary embodiment of a three-dimensional capacitor, wherein three-dimensional structures are formed from conductive coatings on dielectric particulates.

FIG. 14 illustrates a cross-sectional view of a single EDE tri-layer 300 that may form one exemplary embodiment of a three-dimensional capacitor, wherein three-dimensional structures (protrusions) in the form of metal aggregates (inclusions) are formed from conductive coatings on dielectric particulates. The dielectric layer 305 may comprise, for example, metal coated ceramic particles 315, wherein the conductive metal coating on the ceramic particulate may include, but is not limited to, silver-palladium alloys, palladium, palladium alloys, platinum, platinum alloys, silver, silver alloys, gold, gold alloys, etc. In some implementations of the EDE tri-layer 300 the volume fraction of the metal with the dielectric layer can be, e.g., at least about 10%, or at least about 20%, or at least about 30%, or at least about 40%, e.g., in a range of about 40% to about 60%. As a non-limiting example of embodiments that may include silver-palladium coating on dielectric particulate, the percent by weight composition of the silver-palladium coating may be in the range of about 95% Ag and about 5% Pd, more preferably about 90% Ag and about 10% Pd, and most preferably about 70% Ag and about 30% Pd.

The conductive metal coating on dielectric particulate used in some embodiments may include other precious metals and their respective alloys such as, but not limited to, iridium, Rhodium, and ruthenium. Additionally, some embodiments may include a particulate with a metal coating containing base metals such as, but not limited to, copper, nickel, iron, cobalt, manganese, titanium, zinc. Further, it is envisioned that still other embodiments may include dielectric particulate coated with refractory metals such as, but not limited to, tungsten, molybdenum, zirconium, tantalum, and niobium.

Moreover, although the exemplary dielectric layer 305 is described as comprising coated ceramic particles, it is also envisioned that the dielectric portion of coated particles in layer 305 may comprise dielectric matter other than ceramics such as, but not limited to, ceramic and glass-ceramic, precious metal coated ceramics such as, but not limited to, silver-coated ceramics, palladium-coated ceramics, silver palladium coated ceramics, etc. as well as silver coated formulated barium titanate based dielectrics, silver coated glass beads, and inorganic oxides such as, but not limited to, alumina and tantalum oxide. Also, while the metal coating 320 on the ceramic particles 315 may be substantially uniform (not shown) prior to creation of a dielectric green sheet, the metal coating 320 advantageously becomes discontinuous after sintering.

Dielectric layer 305 is depicted as the entire layer of ceramic particles 315 positioned between two electrode plates 310A, 310C. Notably, while plate 310A has been designated in the FIG. 14 illustration as representing the anode plate, and plate 310C as the cathode plate, one of ordinary skill in the art will understand that either conductive plate 310 could perform as the anode or the cathode in a charged capacitor, as an application may require. The ceramic particles of dielectric layer 305 typically range in size from about 0.01 to about 10 microns, but other dielectric particle size ranges are possible as understood by one of ordinary skill in the art.

As explained above, the discontinuity in the metal coating 320 after sintering of the ceramic chips is mainly due to the surface tension between the dissimilar materials of the coated dielectric particles 315, such as, but not limited to, metal and ceramic. Generally, after sintering temperature is reached, the temperature causes the metal coating 320 to flow and aggregate into cavities 325 between the dielectric ceramic particles 315. Advantageously, the aggregated metal 320 that results from the melted particulate coating will cool to form a plurality of three-dimensional structures or protrusions 320 extending or protruding substantially perpendicular down through the dielectric layer from either the anode 310A or cathode 310C plates. Many of the three-dimensional structures 320, which comprise conductive material, may form an interface structure 330 with either the anode 310A or cathode 310C plate of the EDE tri-layer 300. One of ordinary skill in the art will understand that the overall surface areas attributable to the conductive plates 310A, 310C may be effectively increased, with dielectric material dispersed all between the dielectric particles 315, thus increasing the overall capacitive density of the capacitor 300.

As a non-limiting example of capacitive density increase, embodiments of a three-dimensional capacitor have been estimated to have an increased capacity density of anywhere from about ten (10) times to about one thousand (1000) times over traditional capacitor designs. Even so, the above range of capacity density increase is offered for exemplary purposes only and will not be a limiting factor on the scope of the disclosure. One of ordinary skill in the art will recognize that a given three-dimensional capacitor embodiment may advantageously have an increased capacity density when compared to other capacity designs that require an equivalent, or nearly equivalent, space footprint in a circuit.

Importantly, one of ordinary skill in the art will understand that angles besides those which are substantially perpendicular to the dielectric 305 and conductive 310 layers are envisioned as a result of the aggregation of the dielectric particulate coating 315 and, as such, the above description of the three-dimensional structures 330 being substantially perpendicular to the various layers will not limit the scope of a three-dimensional capacitor 300. The three-dimensional structures 315, 320 that are formed both increase the overall surface area attributable to a given conductor plate and also essentially form a plurality of small micro-capacitor tri-layer arrangements within a given EDE tri-layer 300.

Metal-coated ceramic powders suitable for use in the dielectric layer 305 in order to create a three-dimensional capacitor 315, such as the exemplary embodiment described above, can be produced commercially. The innovative capacitor structure may include various dielectric particulate materials and coating combinations, although certain combinations may be more advantageous than others. Moreover, one of ordinary skill in the art will recognize that various parameters may be used to control aspects or properties of the three-dimensional structures in a three-dimensional capacitor such as, but not limited to, the selection of metal coating percentage, sintering temperature, and sintering time.

Figure 15:
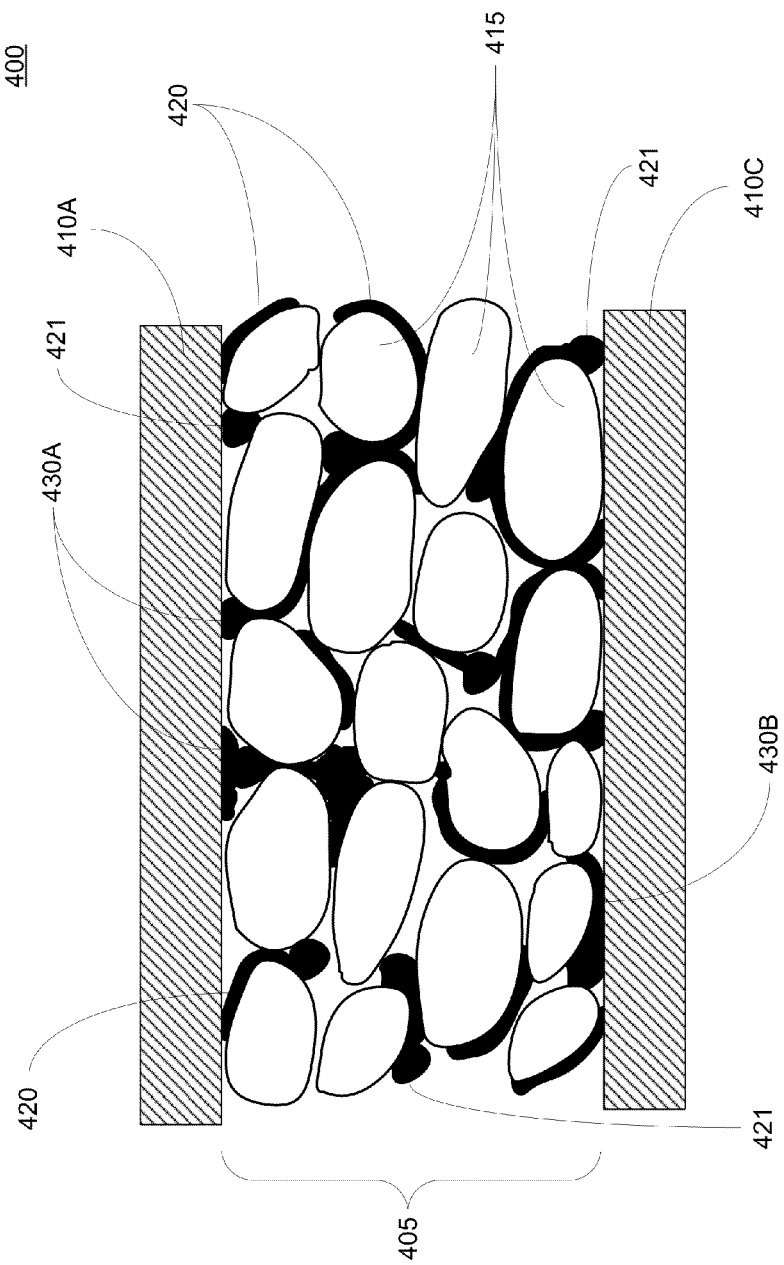
FIG. 15 illustrates a cross-sectional view of a single EDE layer that may form another exemplary embodiment of a three-dimensional capacitor, wherein three-dimensional structures are formed from metal particles mixed into the dielectric slurry of coated dielectric particles.

FIG. 15 illustrates a cross-sectional view of a single EDE layer 400 that forms one exemplary embodiment of a three-dimensional capacitor, wherein three-dimensional structures are formed from metal particles 421 mixed into the dielectric slurry of dielectric particles or coated dielectric particles. Consistent with step 120 of method 101 described above, the electrode plates 410A, 410C are printed over the green tape 215, 405, wherein the green tape 215, 405, instead of being made from a pure dielectric slurry 210, is made of a mixture of metal particulate 421 and dielectric particles or metal coated dielectric particulate 415. As described above relative to the FIG. 14 embodiment, it is envisioned that the metal coated dielectric particulate may be comprise any combination of conductive coating and dielectric particulate and, as such, it will be understood that specific particulate and conductive coating material choices and combinations are offered herein for illustrative purposes and will not limit the scope of the disclosure. Similarly, it is envisioned that metal particulate 421 may comprise any suitable conductive material including, but not limited to, silver, silver palladium alloy, nickel, nickel alloys, copper, copper alloys, etc. The metal coating of the dielectric particles 415 may be discontinuous as a result from the mechanical mixing with the metal particulate 421, however, after sintering, the coating will generally flow and aggregate such that three-dimensional structures or protrusions 420 are formed substantially perpendicular to the dielectric layer, some forming on interface 430A with the top electrode and some forming on interface 430B and being connected to the bottom electrode, with metal particulate 421 aggregated throughout.

The manufacturing of the three-dimensional capacitor layer illustrated in FIG. 14 is essentially equivalent to that which was described relative to method 101. Again, to manufacture the three-dimensional capacitor of the exemplary embodiment illustrated in FIG. 14, modifications to the manufacturing process as described in connection with FIGS. 1-2 are usually made. Specifically, in step 105, if a metal coated dielectric 315 is used in place of the ceramic dielectric powder 205 in the MLCC production, the resulting three-dimensional capacitor will have structure similar to the FIG. 14 embodiment. Similarly, if the mechanical mixture of conductive particulate 421 and dielectric particles or coated dielectric particulate 415 is inserted in place of powder 205, the resultant three-dimensional capacitor will have structure similar to the FIG. 15 embodiment.

Unique Component Selection and Additional Manufacturing Steps

By incorporation of additional manufacturing steps to accommodate various novel component selections, a unique ceramic capacitor manufacturing method 101 may be used to create three-dimensional capacitors.

Figure 16:
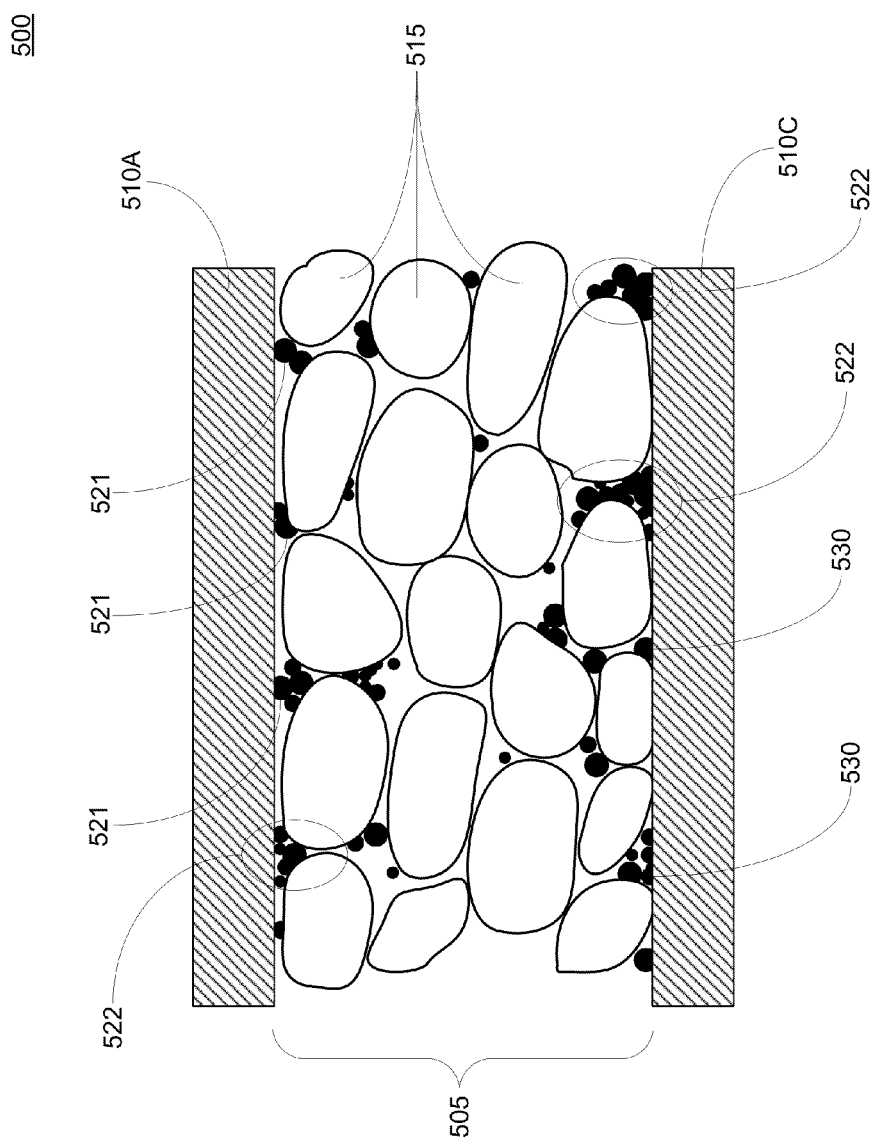
FIG. 16 illustrates a cross-sectional view of a single EDE tri-layer that may form another exemplary embodiment of a three-dimensional capacitor, wherein metal particles are impregnated into the dielectric green tape.

FIG. 16 illustrates a cross-sectional view of a single EDE tri-layer 500 that may form an exemplary embodiment of a three-dimensional capacitor, wherein metal particles 521 are impregnated into the dielectric green tape 215, 505. A metal powder containing fine particulate may be made into a slurry and applied to the surface of the dielectric green tape 215 described relative to method 101 such that the metal particles 521 are forced into voids between the dielectric particles 515. Similar to that which has been described relative to the FIG. 14 and FIG. 15 embodiments, it is envisioned that metal particulate 521 may comprise any suitable conductive material including, but not limited to, silver, silver palladium alloy, nickel, nickel alloys, copper, copper alloys, etc. As such, it will be understood that metal particulate material choices will occur to those with ordinary skill in the art and will not limit the scope of the disclosure.

Essentially, the application of the fine particle metal slurry causes the metal particles 521 to penetrate the "pores" of the dielectric tape 215, 505, thereby potentially aggregating to create protrusions 522 that form an interface 530 with plates 510A, 510C. Advantageously, any interfaced protrusions 522 may operate to effectively increase the surface area that is attributable to conductive plates 510A, 510C.

Referring back to method 101, an additional step may be added after step 110, and before screen printing step 120, such that the deposition of a slurry containing suitably fine-sized metal particulate 521 can be applied to the dielectric tape 215 before printing the electrode ink 510A, 510B in the electrode screen printing step 120.

Figure 17:
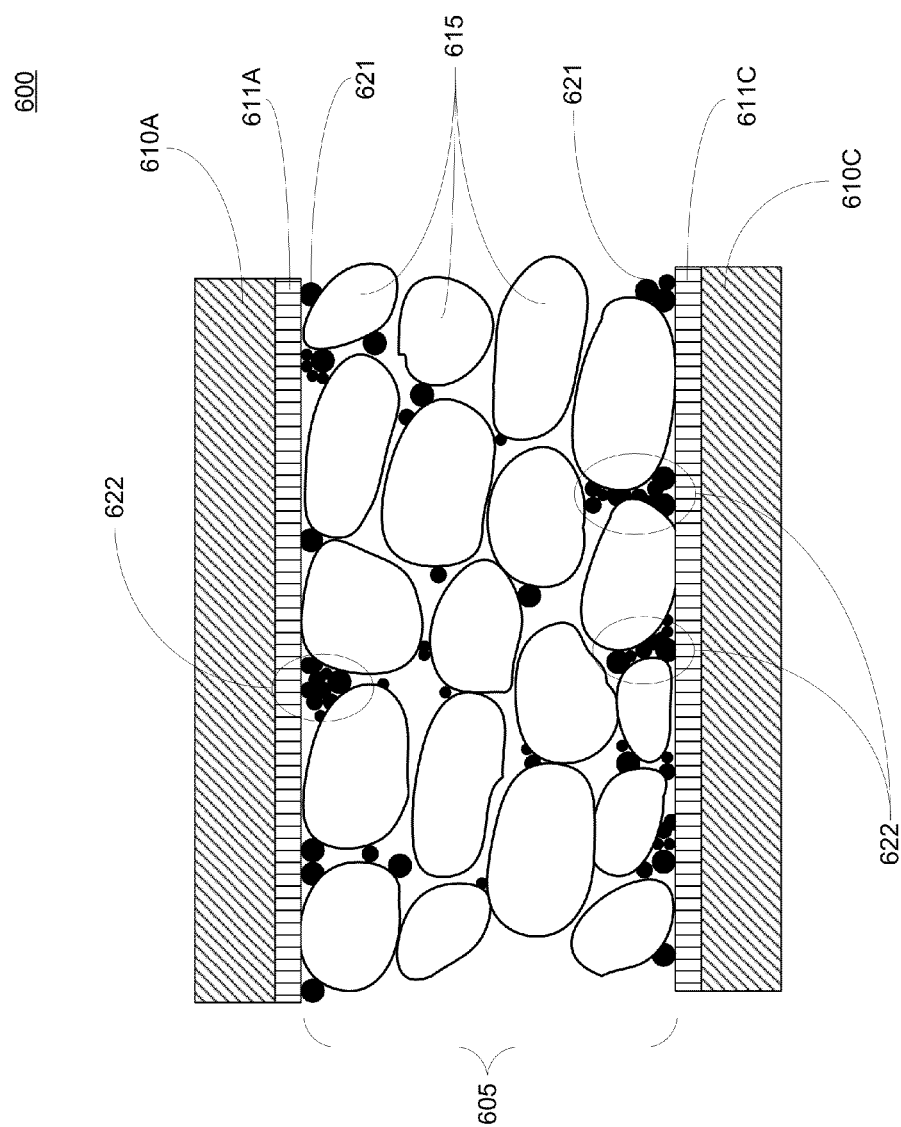
FIG. 17 illustrates a cross-sectional view of a single EDE tri-layer that may form another exemplary embodiment of a three-dimensional capacitor, wherein metal particles are impregnated into the dielectric green tape and the conductor plates comprise a layer of low melting point electrode material adjacent to the dielectric layer.

FIG. 17 illustrates a cross-sectional view of a single EDE tri-layer 600 that may form an exemplary embodiment of a three-dimensional capacitor, wherein metal particles 621 are impregnated into the dielectric green tape 215, 605 and the conductor plates comprise a layer of low melting point electrode material adjacent to the dielectric layer 605. Similar to the FIG. 16 embodiment, FIG. 17 illustrates an electrode structure formed by diffusion of a low melt point metal conductor 611A, 611C adjacent to the dielectric layer 605 (low melt point is relative to the melt point of the material used for the primary conductor plates 610A, 610C). For example, use of a 100% silver electrode 611A, 611C beneath an upper electrode layer 610A, 610C of about 95% Ag/5% Pd (silver/palladium alloy) may increase the metal flow into cavities between dielectric particulate 615 during sintering step 140, thereby creating three-dimensional structures or protrusions 622 in conjunction with optional impregnated metal particulate 621. Notably, while the FIG. 17 illustration depicts an embodiment comprising both low melt point conductor layers 611A, 611C and impregnated metal particulate 621, it will be understood that similar embodiments may not comprise the impregnated particulate 621 as the low melt point material may suitably generate conductive protrusions as it flows upon sintering into voids between the dielectric particulate 615.

Similar to that which has been described relative to the FIG. 14 and FIG. 15 embodiments, it is envisioned that metal particulate 621 may comprise any suitable conductive material including, but not limited to, silver, silver palladium alloy, nickel, nickel alloys, copper, copper alloys, etc. As such, it will be understood that metal particulate material choices will occur to those with ordinary skill in the art and will not limit the scope of the disclosure. Importantly, one of ordinary skill in the art will also recognize that similar embodiments to the exemplary FIG. 17 embodiment may call for the low melt point conductor layers to be positioned above the primary conductors such that the primary conductors are juxtaposed to the dielectric.

Referring back to method 101, an additional step may be added within screen printing step 120, such that the low melting electrode paste is printed in the same step but prior to the printing of the primary electrodes 610.

The exemplary embodiments of a three-dimensional capacitor, which have been described and depicted relative to FIGS. 3 through 6, utilize electrode layers comprising primarily conductive particulate or rigid plates such as, but not limited to, silver, silver/palladium alloy, nickel, nickel alloys, copper or copper alloys. Other embodiments of a three-dimensional capacitor, however, utilize anode and cathode layers comprising metal coated, nonconductive material such as, but not limited to, silver coated ceramic particulate or any combination of conductive coating and nonconductive material. Moreover, in such embodiments that utilize metal coated, non conductive material for the conductive layers of a three-dimensional capacitor, the specific percent by weight in the conductive layer that is attributable to the nonconductive material or, alternatively, the conductive coating, may vary by embodiment and can range from about 1% to about 90%. Advantageously, such embodiments may realize a cost savings over traditional capacitor arrangements in addition to providing various benefits of three-dimensional structure.

Figure 18:
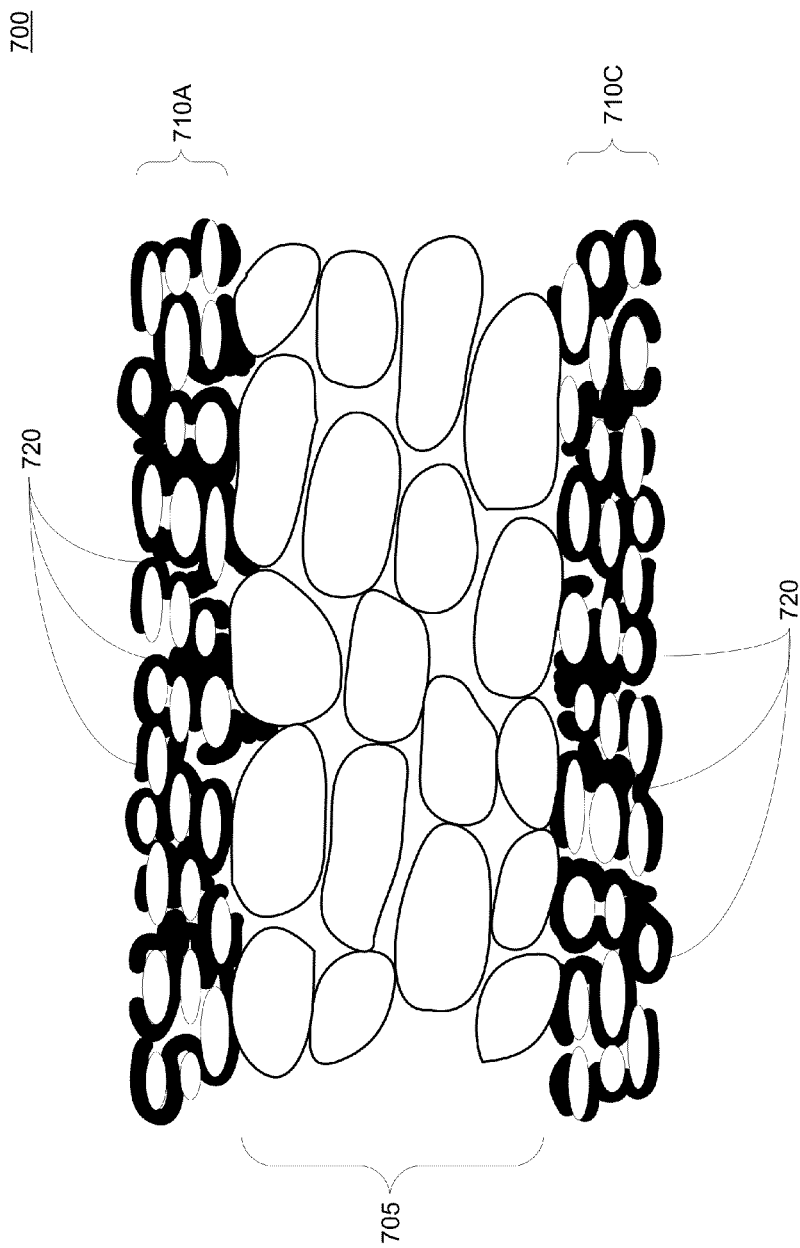
FIG. 18 illustrates a cross-sectional view of a single EDE tri-layer that may form another exemplary embodiment of a three-dimensional capacitor, wherein metal coated particulate are used to create the conductive layers between which a dielectric layer is sandwiched.

FIG. 18 illustrates a cross-sectional view of a single EDE tri-layer 700 that may form an exemplary embodiment of a three-dimensional capacitor, wherein metal coated particulate 720 is used to create the conductive layers 710A, 710C between which a dielectric layer 705 is sandwiched. In the exemplary FIG. 7 embodiment, electrode ink 225 applied over the green tape 705 at screen printing step 120 may comprise conductive coated particulate, such as, but not limited to, metal coated ceramic powder as well as any other particulate and coating combinations that may occur to one of ordinary skill in the art. Advantageously, upon exposure to sintering temperatures at step 140, a functional electrode layer 710 is formed from the ink when a three-dimensional metal network 720 results from the aggregation of the melted particulate coating in the electrode layers 710. Importantly, in some embodiments, the three-dimensional metal network 720 in the electrode layers 710 may also be achieved by mechanically mixing the electrode and dielectric.

Figure 19:
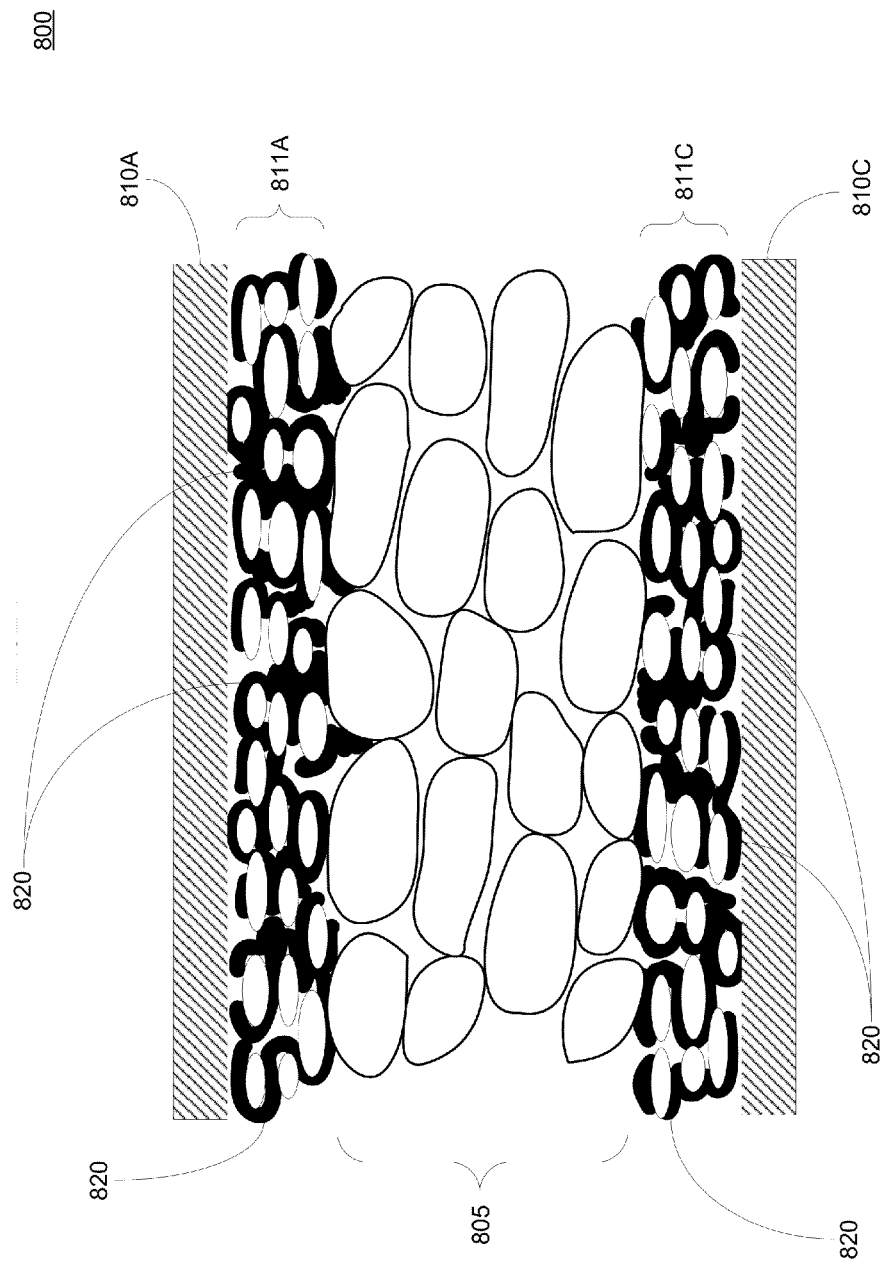
FIG. 19 illustrates a cross-sectional view of a single EDE tri-layer that may form another exemplary embodiment of a three-dimensional capacitor, wherein a metal coated ceramic layer is formed between the dielectric layer and the electrode layers.

FIG. 19 illustrates a cross-sectional view of a single EDE tri-layer 800 that may form an exemplary embodiment of a three-dimensional capacitor, wherein a metal coated ceramic layer 811A, 811C is formed between the dielectric layer 805 and the electrode layers 810A, 810C. The dielectric layer 805 in this exemplary embodiment may be formed from dielectric materials, such as, for example, standard uncoated ceramics. The metal-coated ceramic layer 811 forms a network 820 and is electrically connected to the respective electrode layers 810. Similar to the low melt point conductive layer described relative to the FIG. 17 embodiment of a three-dimensional capacitor, the metal-coated ceramic layers 811 can be printed at step 120 using ink containing metal-coated ceramic particles, prior to printing the standard electrodes 810A, 810C (alternatively, the standard electrode layer could be printed prior to the metal coated ceramic particulate layer in some embodiments).

The exemplary embodiments of a three-dimensional capacitor which have been described and depicted in FIGS. 3 through 8, are embodiments formed from the controlled flow of conductive coatings on dielectric particulate and/or impregnation of conductive particles.

Manufacturing Process with Mechanical Conversion Steps and/or Pre-Designed Plate Geometry Some embodiments of a three-dimensional capacitor have three-dimensional structures positioned substantially perpendicular to the dielectric layer by virtue of planned conductor/dielectric geometry and/or mechanical conversion techniques.

Figure 20:
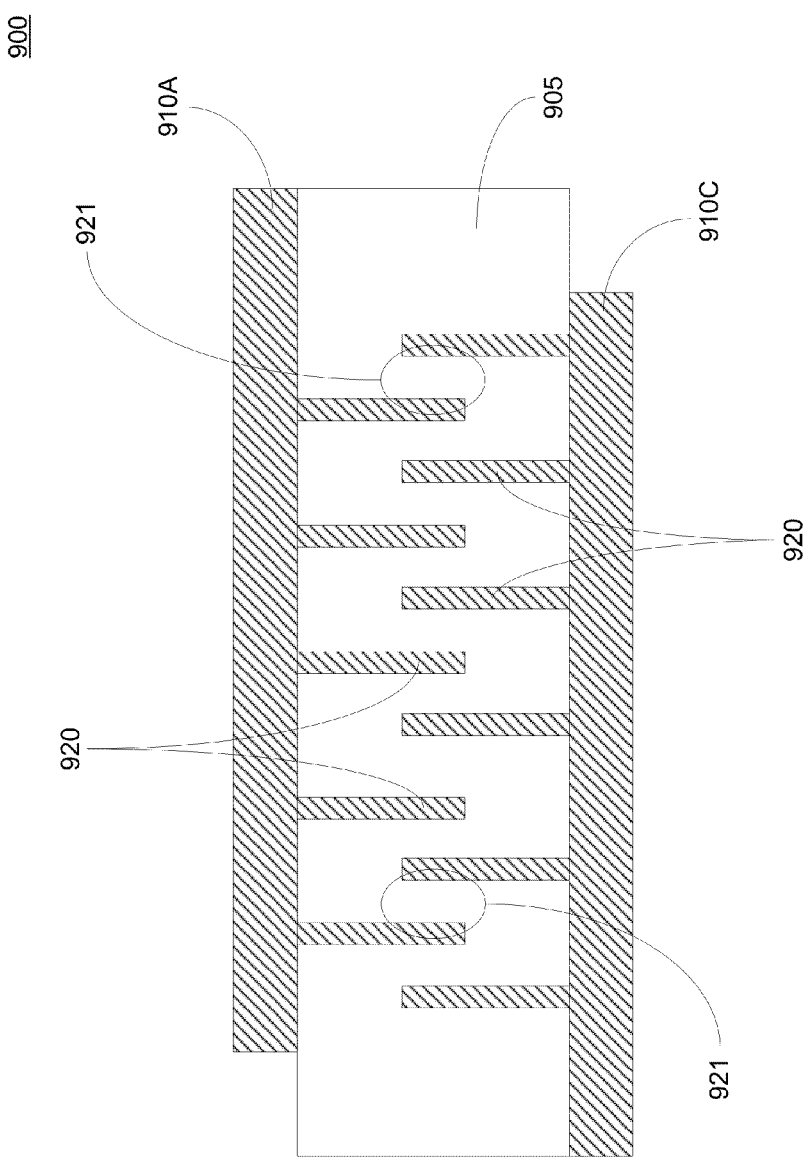
FIG. 20 illustrates a cross-sectional view of a single EDE tri-layer that may form another exemplary embodiment of a three-dimensional capacitor, wherein three-dimensional structures protrude perpendicularly from the primary conductor layers into the dielectric layer.

FIG. 20 illustrates a cross-sectional view of a single EDE tri-layer 900 that may form an exemplary embodiment of a three-dimensional capacitor, wherein three-dimensional structures (or protrusions) 920 protrude perpendicularly from the anode 910A and cathode 910C layers into the dielectric 905. Two electrodes 910 are separated by a dielectric layer 905. The dielectric layer 905 in the exemplary FIG. 20 embodiment may be formed from conventional dielectric materials, such as, but not limited to, standard uncoated ceramics, however it is envisioned that coated particulate similar to that which is described above may be used in various embodiments.

The "slots" or "bores" that accommodate the electrode protrusions 920 are created in dielectric 905 by any suitable mechanical device or boring method as understood by one of ordinary skill in the art. Substantially perpendicular, three-dimensional electrode extensions or finger-like protrusions 920 are then created by filling the slots with conductive material. Connected to their respective electrodes 910A, 910C, electrode protrusions 920 create additional capacitor arrangements within the main capacitor 900 at areas of overlap 921 between anode and cathode protrusion 920 pairs. Consistent with embodiments described above, the electrode extensions 920 work in conjunction with the primary electrode plates 910 to increase the effective surface area of the electrode layers and thusly improve the capacitive density of a capacitor that includes such a tri-layer 900.

In FIG. 20, the slots and corresponding electrode protrusions 920 are depicted as being perpendicular to the cross section. It should be understood, however, that the protrusions 920 can be parallel to the cross section to provide for electrode extensions 920 that are electrically connected to one of the primary conductor plates by virtue of edge metallization and termination techniques, even though such a layout is not shown. Suitable ways to create the slots may include, but are not limited to, laser drilling, mechanical punching, etc. Suitable ways to fill the slots to create electrode protrusions may include, but are not limited to, printing electrode ink over the dielectric tape to fill the slots or printing the dielectric ink to fill altering slots in order to insulate a given electrode 920 from a given conductor layer 910. It is envisioned that the patterning can also be accomplished via photolithographic techniques or imprint printing. Other methods for leveraging bores in the dielectric in order to generate a three-dimensional capacitor embodiment will occur to those with ordinary skill in the art and, as such, the particular exemplary embodiments depicted in the figures, and described herein, will not limit the scope of the disclosure as understood to one of ordinary skill in the art.

With regards to the exemplary embodiment depicted in FIG. 20, and similar embodiments, it should be apparent to one of ordinary skill that the pattern density, therefore, the capacitance, is limited by the resolution of the mechanical means to form the slots and the printing means to fill the slots.

Figure 21:
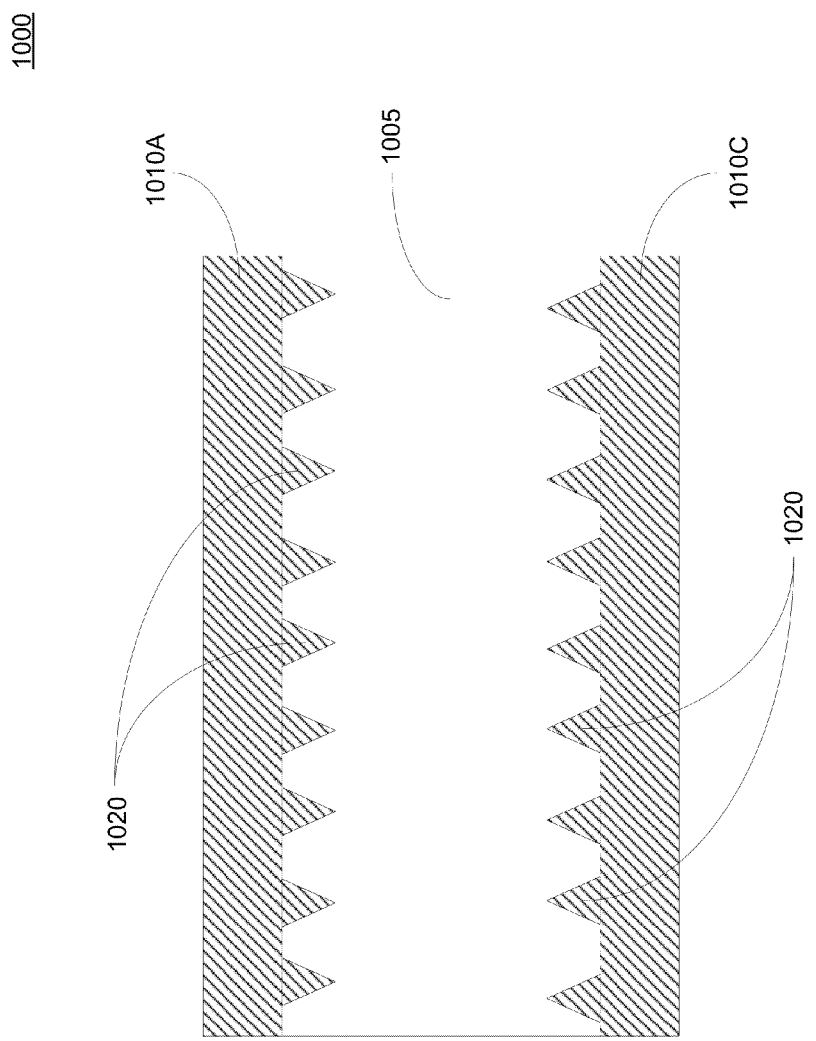
FIG. 21 illustrates a cross-sectional view of a single EDE tri-layer that may form another exemplary embodiment of a three-dimensional capacitor, wherein three-dimensional structures protrude from the primary conductor layers into the dielectric layer.

FIG. 21 illustrates a cross-sectional view of a single EDE tri-layer 1000 that may form an exemplary embodiment of a three-dimensional capacitor, wherein three-dimensional structures (or protrusions) 1020 protrude from the primary conductor layers into the dielectric layer 1005. Similar to previously described embodiments, the exemplary embodiment of FIG. 21 advantageously increases capacitive density via the increase of anode and cathode surface area that is coupled to the dielectric 1005. The electrode structures 1020 may be formed by patterning techniques such as, but not limited to, imprint printing, molding, etc. That is, the three-dimensional structures 1020 may be created in a modified green tape component via application (such as stamping) of a die with teeth to the dielectric green tape 215 prior to screen-printing the electrode layer 1010 at step 120 of exemplary method 101.

The dielectric layer 1005 in the exemplary FIG. 21 embodiment may be formed from conventional dielectric materials, such as standard uncoated ceramics, but such is not required in all embodiments. Upon screen printing the modified green tape, the electrodes 1010 acquire projections 1020 that are attributable to the exemplary teeth imprints that resulted from stamping or molding the green tape into the modified dielectric layer 1005. The projections 1020 may function as extended electrodes to effectively create additional surface area within the main capacitor 1000 for gathering electrical charge.

For manufacturing the exemplary embodiment of FIG. 21, and similar embodiments, modifications to the manufacturing method 101 may include adding texture to the dielectric tape after or during the "tape casting" step 110. Notably, one of ordinary skill will recognize that patterns for the projections 1020 other than those illustrated can be used in similar embodiments of a three-dimensional capacitor.

Figure 22:
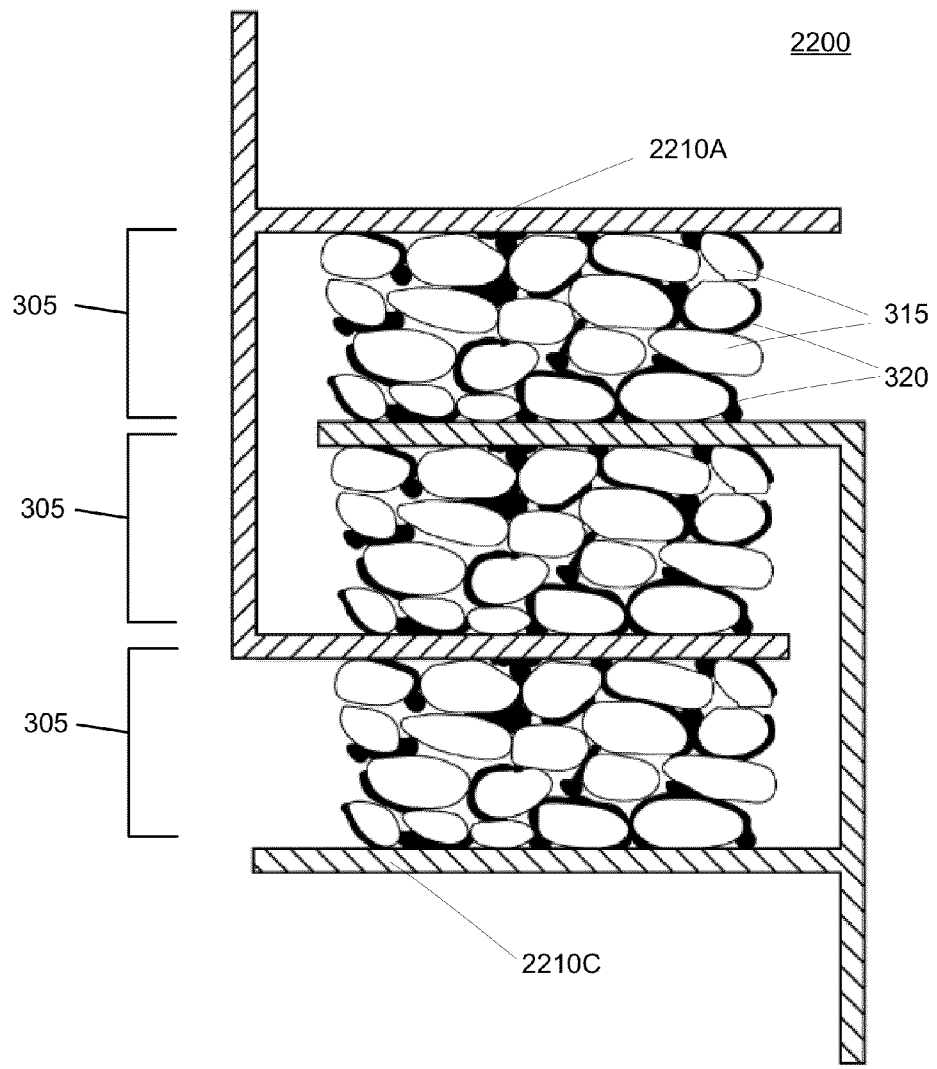
FIG. 22 illustrates a cross-sectional view of another exemplary embodiment of a three-dimensional capacitor having a plurality of discrete metal inclusions in the dielectric layer but without a "depletion layer" adjacent to the electrodes.

Referring now to FIG. 22 illustrates a cross-sectional view of another exemplary embodiment of a three-dimensional capacitor 2200 having a plurality of discrete metal inclusions 320 in the dielectric layer 305 but without a "depletion layer" adjacent to the electrodes. This exemplary embodiment is similar to the exemplary embodiment illustrated in FIG. 14, so only the differences will be described below. According to this exemplary embodiment, there are three dielectric layers 305. These three dielectric layers 305 are positioned adjacent to each other without any depletion layer disposed between them. A depletion layer 705 or 805 may be found in the exemplary embodiments of FIGS. 18-19. A depletion layer 705, 805 is one that is a substantially metal free dielectric layer.

Certain steps in the processes or process flow described in this specification must naturally precede others for a given three-dimensional capacitor embodiment to function as described. However, the manufacture of a three-dimensional capacitor is not limited to the order of the steps described if such order or sequence does not alter the functionality of the three-dimensional capacitor resulting there from. That is, it is recognized that some steps may be performed before, after, or in parallel with other steps without departing from the scope and spirit of the disclosure. In some instances, certain steps can be deleted or not performed, without departing from the invention.

The three-dimensional capacitor as described above may comprise about 1 to about 1000 layers, preferably about 300 to about 500 layers, with dielectric layer thicknesses often being from about 1 to about 50 microns. When only a single layer of dielectric is utilized, a single layer capacitor is formed, often seen in the passive integration in low temperature co-fired ceramic (LTCC) technologies. The three-dimensional capacitor may also comprise as small as a 0402 size (about 0.04 inch by about 0.02 inch) and even a 0201 size (about 0.02 inch by about 0.01 inch).

CONCLUSIONS

Accordingly, the method 101, exemplary embodiments, and actual samples described above disclose capacitors that may include a pair of electrodes (such as 10 in FIG. 1D, and 310A, 310C in FIG. 14). A metalized dielectric layer, formed from metal coated dielectric tapes (such as 30 in FIG. 1C, generally found in FIGS. 1C-13) or metal coated ceramic particles, (such as 315 of FIG. 14, generally found in FIGS. 14-22) may be disposed between the pair of electrodes. The metalized dielectric layer may comprise a plurality of metal aggregates (such as metal pockets 605 of FIGS. 1C and 6, such as metal coatings 320 of FIG. 14, such as metal particles 421 of FIG. 15, etc.) distributed within a dielectric material (such as 30 of FIG. 1 and FIG. 6, such as ceramic particles 320 of FIG. 14, such as dielectric particles 415 of FIG. 15) such that a volume fraction of metal in the metalized dielectric layer is at least about 30%. The plurality of metal aggregates may be separated from one another by the dielectric material.

The capacitor may include least one substantially metal free dielectric layer referred to as a "depletion layer", such as 20A in FIG. 1C, that separates the metalized dielectric layer (30 of FIG. 1C,) from at least one of the electrodes (10 of FIG. 1C). The volume fraction of the metal may be in a range of about 30% to about 60%, and more preferably, the volume fraction of the metal is in a range of about 40% to about 60%.

The metalized dielectric layer may have a thickness in a range of about 0.01 micron to about 50.0 microns. The resultant capacitor described above may exhibit a capacitance which is at least five times of that without the metalized dielectric layer. As noted above, the dielectric materials in the capacitor may comprise a ceramic. The ceramic may comprise any one of a barium titanate based ceramics or other type of capacitor dielectrics, such as, lead magnesium tantalates and niobates, a glass ceramic, inorganic oxides, alumina oxide, and tantalum oxide.

As noted above, the ceramic may comprise a plurality of ceramic particles (such as particles 315 of FIG. 14) that are partially coated with metal aggregates (coatings 320 as illustrated in FIG. 14). The ceramic particles may have a size in a range of about 0.001 microns to about 10 microns.

The metal aggregates used may comprise any one of silver, palladium, nickel, gold, platinum, iridium, tungsten, molybdenum, tantalum, niobium, hafnium, rhenium, nickel, and copper. The metal aggregates and at least one of the electrodes may or may not have at least one metallic constituent in common. That is, the metal aggregates and at least one of the electrodes may not be formed of the same metal. The electrodes may be formed of any of silver, palladium, nickel, gold, platinum, iridium, tungsten, molybdenum, tantalum, niobium, hafnium, rhenium, nickel, and copper.

A MLCC formed by the techniques described above may include a plurality of electrodes and a plurality of dielectric layers, in which each dielectric layers is disposed between two of the electrodes. At least one of the dielectric layers of the MLCC has a metalized portion comprising a dielectric material in which a plurality of metal inclusions are distributed. A volume fraction of metal in the metalized portion is at least about 20%, and more particularly, at least about 30% and wherein said the inclusions are separated from another by the dielectric material.

A metalized portion of the dielectric layer may comprise a mixture of a ceramic and a plurality of metal inclusions. The ceramic may comprise a plurality of ceramic particles. The ceramic particles may have sizes in a range of about 0.001 microns to about 10 microns.

The metal inclusions and at least one of the electrodes of the capacitor may or may not have at least one metal constituent in common. The metal inclusions and the at least one electrode may or may not be formed of the same metal. The metal inclusions may comprise silver, a non-oxidizing metal. The dielectric layer may comprise a substantially two-phase composition that includes a metal coated dielectric tape or ceramic particles coated with a metal.

A capacitor produced by the techniques described above may include a pair of electrodes 10 and a dielectric layer 30,40 disposed between the pair of electrodes 10 as illustrated in FIG. 1C. The dielectric layer 30,40 may comprise at least one metalized portion 30 having a plurality of discrete metal inclusions 605 and at least one substantially metal free portion 20A separating said at least one metalized portion 30 from at least one of the pair of electrodes 10 as illustrated in FIG. 1C. The in-situ formed depletion layer 20A may have a thickness of about 0.1 micron to 10 microns.

A method of forming a metal-dielectric composite is disclosed which includes (A) coating a plurality of dielectric particles with a metal to form a plurality of metal-coated dielectric particles (applying a metal coating to a dielectric tape as illustrated as FIGS. 1C-13 OR coating particles individually as illustrated in FIGS. 14-22)); and sintering the plurality of metal-coated dielectric particles at a temperature of at least about 750° C. to 950° C. for silver to transform said metal coatings into a plurality of discrete, separated metal aggregates.

The method includes selecting the sintering temperature to be in a range of about 750° C. to about 950° C. if silver is used. The plurality of metal-coated dielectric particles are usually sintered for a duration in a range of about 0.1 to 10 hours. As noted above, in the method and system, the plurality of dielectric particles or dielectric tape comprises a ceramic material. The dielectric particles may have sizes in a range of about 0.001 microns to about 10 microns. Meanwhile, the metal applied to the dielectric particles may comprise any of silver, palladium, nickel, gold, platinum, iridium, tungsten, molybdenum, tantalum, niobium, hafnium, rhenium, nickel, and copper. The metal may be substantially non-oxidizing.

The exemplary three-dimensional capacitor embodiments described above employ a so-called 'tape process' (as shown in FIGS. 1A-1B). It is envisioned, however, that three-dimensional capacitor embodiments can also be made using the so-called 'wet process', in which the dielectric layer is actually printed using dielectric slurry.

A three-dimensional capacitor and methods of its manufacture have been described using detailed descriptions of embodiments thereof that are provided by way of example and are not intended to limit the scope of the disclosure. The described embodiments comprise different features, not all of which are required in all embodiments of a three-dimensional capacitor. Some embodiments of a three-dimensional capacitor utilize only some of the features or possible combinations of the features. Variations of embodiments of a three-dimensional capacitor and methods of its manufacture are included within the scope of the invention as understood to one of ordinary skill in the art.

It is envisioned that the systems, devices, methods and arrangements, or features or aspects thereof, disclosed herein in the context of MLCCs can be used in other related or analogous applications such as, but not limited to, ceramic and plastic polymer substrates for embedded passive component applications. Thus, one of ordinary skill in the art will recognize that disclosed embodiments, or variations thereof, can be incorporated into, among other applications, low-temperature co-fired ceramic (LTCC) applications, high-temperature co-fired ceramic (HTCC) applications, thick film hybrid circuits and printed circuit boards (PCB). Further, it is envisioned that disclosed embodiments, or variations thereof, can be employed in super-capacitors or super-capacitor applications, as electrode protrusions in a three-dimensional capacitor advantageously generate an increase in electrode surface area that may be desirable in super-conductors or super-conductor applications.

The word "exemplary" is used herein to mean "serving as an example, instance, or illustration." Any aspect described herein as "exemplary" is not necessarily to be construed as preferred or advantageous over other aspects.

Therefore, although selected aspects have been illustrated and described in detail, it will be understood that various substitutions and alterations may be made therein without departing from the spirit and scope of the present invention, as defined by the following claims.

What is claimed is:

1. A capacitor, comprising:
   a pair of electrodes;
   a metalized dielectric layer disposed between said pair of electrodes, said metalized dielectric layer including a plurality of metal aggregates distributed within a dielectric material such that a volume fraction of metal in said metalized dielectric layer is at least about 30% and
   wherein said plurality of metal aggregates are separated from one another by said dielectric material, the metal aggregates being distributed in a non-uniform and discontinuous manner such that the metal aggregates form protrusions having dissimilar geometries.

2. The capacitor of claim 1, further comprising at least one substantially metal free dielectric layer formed in-situ during sintering and which separates said metalized dielectric layer from at least one of said electrodes.

3. The capacitor of claim 1, wherein said volume fraction of the metal is in a range of about 30% to about 60%.

4. The capacitor of claim 1, wherein said volume fraction of the metal is in a range of about 40% to about 50%.

5. The capacitor of claim 1, wherein said metalized dielectric layer is configured as a floating electrode.

6. The capacitor of claim 1, wherein said metalized dielectric layer is configured as an electrode for electrical coupling with a voltage terminal.

7. The capacitor of claim 1, wherein said metalized dielectric layer has a thickness in a range of about 0.01 micron to about 250.0 microns.

8. The capacitor of claim 1, wherein said capacitor exhibits a capacitive density which is about 2 to about 1000 or higher times than that capacitor without the metalized dielectrics.

9. The capacitor of claim 1, wherein said dielectric material comprises a ceramic.

10. A multi-layer capacitor, comprising:
    a plurality of electrodes;
    a plurality of dielectric layers, each of said dielectric layers being disposed between two of said electrodes;
    at least one of said dielectric layers having a metalized portion comprising a dielectric material in which a plurality of metal inclusions are distributed;

wherein a volume fraction of metal in said metalized portion is at least about 30% and wherein said metal inclusions are separated from another by said dielectric material, the metal inclusions being distributed in a non-uniform and discontinuous manner such that the metal inclusions form protrusions having dissimilar geometries.

11. The multi-layer capacitor of claim 10, further comprising at least one substantially metal free dielectric layer formed in-situ during sintering and which separates said metalized dielectric layer from at least one of said electrodes.

12. The multi-layer capacitor of claim 11, a volume fraction of metal in said metalized dielectric layer is at least about 30%.

13. The multi-layer capacitor of claim 12, wherein said volume fraction of the metal is in a range of about 40% to about 60%.

* * * * *